(12) United States Patent
Anderson et al.

(10) Patent No.: US 12,193,567 B2
(45) Date of Patent: Jan. 14, 2025

(54) DRAWER GLIDE MECHANISM

(71) Applicant: AMERICAN WOODMARK MANAGEMENT COMPANY, Winchester, VA (US)

(72) Inventors: Bradly Anderson, Ontario, CA (US); Edward William Roy Lachman, Anaheim, CA (US); Jeffrey Scott Hoeft, Laguna Hills, CA (US)

(73) Assignee: AMERICAN WOODMARK MANAGEMENT COMPANY, Winchester, VA (US)

( * ) Notice: Subject to any disclaimer, the term of this patent is extended or adjusted under 35 U.S.C. 154(b) by 0 days.

(21) Appl. No.: 18/350,644

(22) Filed: Jul. 11, 2023

(65) Prior Publication Data

US 2024/0041206 A1  Feb. 8, 2024

Related U.S. Application Data

(63) Continuation of application No. 17/384,166, filed on Jul. 23, 2021, now abandoned, which is a continuation of application No. 16/703,015, filed on Dec. 4, 2019, now abandoned, which is a continuation of application No. 13/783,077, filed on Mar. 1, 2013, now abandoned.

(60) Provisional application No. 61/606,266, filed on Mar. 2, 2012, provisional application No. 61/606,290, filed on Mar. 2, 2012.

(51) Int. Cl.
| | |
|---|---|
| A47B 88/00 | (2017.01) |
| A47B 88/423 | (2017.01) |
| A47B 88/437 | (2017.01) |
| A47B 88/463 | (2017.01) |
| A47B 88/487 | (2017.01) |
| A47B 88/493 | (2017.01) |
| A47B 88/57 | (2017.01) |

(52) U.S. Cl.
CPC .......... *A47B 88/437* (2017.01); *A47B 88/423* (2017.01); *A47B 88/463* (2017.01); *A47B 88/487* (2017.01); *A47B 88/493* (2017.01); *A47B 88/57* (2017.01)

(58) Field of Classification Search
CPC .......... A47B 88/437423; A47B 88/487; A47B 88/493; A47B 88/463; A47B 88/57; A47B 88/43; A47B 88/0059; A47B 2210/0054
USPC .................... 312/334.1, 334.4, 334.5, 334.11
See application file for complete search history.

(56) References Cited

U.S. PATENT DOCUMENTS

| | | | |
|---|---|---|---|
| 1,343,513 | A | 6/1920 | Lenhart |
| 1,910,208 | A | 5/1933 | Gronberg et al. |
| 2,336,153 | A | 12/1943 | Ryder |
| 2,551,843 | A | 5/1951 | Knuth et al. |
| 2,692,802 | A | 10/1954 | Kurtzon et al. |

(Continued)

FOREIGN PATENT DOCUMENTS

| | | |
|---|---|---|
| DE | 3818765 A1 | 10/1989 |
| DE | 9209067 U1 | 9/1992 |

(Continued)

*Primary Examiner* — Janet M Wilkens
(74) *Attorney, Agent, or Firm* — Knobbe, Martens, Olson & Bear, LLP

(57) ABSTRACT

A drawer glide mechanism includes a first elongate guide member, a second elongate glide member, and a v-notch socket. The first and second elongate members are ball-bearing guide members. The first elongate guide member includes a distal end that is configured to fit within an opening in the v-notch socket, thereby locking it in place.

18 Claims, 23 Drawing Sheets

(56) References Cited

U.S. PATENT DOCUMENTS

| | | |
|---|---|---|
| 2,711,358 A | 6/1955 | Gussack |
| 2,843,444 A | 7/1958 | Nelson |
| 2,859,070 A | 11/1958 | Gomersall |
| 2,956,605 A | 10/1960 | Rapta |
| 2,981,584 A | 4/1961 | Friend |
| 2,985,491 A | 5/1961 | Hayes et al. |
| 2,992,057 A | 7/1961 | Maxwell et al. |
| 3,031,249 A | 4/1962 | Koch |
| 3,099,501 A | 7/1963 | Hilson et al. |
| 3,418,869 A | 12/1968 | Herpich |
| 3,451,734 A | 6/1969 | Laure |
| 3,469,892 A | 9/1969 | Langstroth |
| 3,829,191 A | 8/1974 | Jenkins |
| 3,869,958 A | 3/1975 | Murayama |
| 3,874,748 A | 4/1975 | Figueroa |
| 4,113,328 A | 9/1978 | Vander Meulen |
| 4,181,383 A | 1/1980 | Naef |
| 4,240,323 A | 12/1980 | Kojima |
| 4,263,833 A | 4/1981 | Loudin |
| 4,278,309 A | 7/1981 | Dreiling |
| 4,288,137 A | 9/1981 | MacDonald |
| 4,295,688 A | 10/1981 | Blasnik |
| 4,311,421 A | 1/1982 | Okada et al. |
| 4,362,346 A | 12/1982 | Emmert |
| 4,387,942 A | 6/1983 | Lense |
| 4,579,492 A | 4/1986 | Kazino et al. |
| 4,581,799 A | 4/1986 | Bessinger |
| 4,597,603 A | 7/1986 | Trabert |
| 4,601,522 A | 7/1986 | Röck |
| 4,610,587 A | 9/1986 | Wollar et al. |
| 4,737,039 A | 4/1988 | Sekerich |
| 4,842,422 A | 6/1989 | Nelson |
| 4,878,791 A | 11/1989 | Kurihara et al. |
| 4,881,826 A | 11/1989 | Grass |
| 4,909,558 A | 3/1990 | Roshinsky |
| 4,919,548 A | 4/1990 | Lautenschlager |
| 4,979,262 A | 12/1990 | Lautenschlager |
| 5,039,181 A | 8/1991 | Lautenschlager |
| 5,257,861 A | 11/1993 | Domenig et al. |
| 5,302,030 A | 4/1994 | Buie et al. |
| 5,310,255 A | 5/1994 | Ranallo |
| 5,345,959 A | 9/1994 | Matteson |
| 5,387,033 A | 2/1995 | Domenig |
| 5,439,283 A | 8/1995 | Schröder et al. |
| 5,457,807 A | 10/1995 | Weinblatt |
| 5,457,867 A | 10/1995 | Maberry et al. |
| 5,466,060 A | 11/1995 | Hoffman |
| 5,490,724 A | 2/1996 | Domenig |
| 5,549,376 A | 8/1996 | Domenig |
| 5,562,333 A | 10/1996 | Domenig et al. |
| 5,564,807 A | 10/1996 | Rock et al. |
| 5,597,220 A | 1/1997 | Domenig et al. |
| 5,636,820 A | 6/1997 | Domenig |
| 5,636,891 A | 6/1997 | Van Order et al. |
| 5,641,216 A | 6/1997 | Grass |
| 5,695,265 A | 12/1997 | Hoffman |
| 5,733,026 A | 3/1998 | Munachen |
| 5,746,490 A | 5/1998 | Domenig |
| 5,806,949 A | 9/1998 | Johnson |
| 5,823,648 A | 10/1998 | Domenig |
| 5,895,101 A | 4/1999 | Cabrales et al. |
| 6,010,200 A | 1/2000 | Hays |
| 6,076,908 A | 6/2000 | Maffec |
| 6,302,502 B1 | 10/2001 | Larsen, Jr. |
| 6,325,473 B1 | 12/2001 | Brustle et al. |
| 6,367,900 B1 | 4/2002 | Woerner |
| 6,386,661 B1 | 5/2002 | Woerner |
| 6,402,276 B1 | 6/2002 | King |
| 6,478,393 B2 | 11/2002 | Kim et al. |
| 6,494,550 B1 | 12/2002 | Chen et al. |
| 6,494,551 B1 | 12/2002 | Markley |
| 6,557,960 B2 | 5/2003 | Shih |
| 6,565,168 B1 | 5/2003 | Baliko |
| 6,585,336 B2 | 7/2003 | Munday et al. |
| 6,619,771 B2 | 9/2003 | Kueng et al. |
| 6,619,772 B2 | 9/2003 | Dierbeck |
| 6,733,098 B1 | 5/2004 | Branson |
| 6,757,937 B2 | 7/2004 | Salice |
| 6,788,997 B1 | 9/2004 | Frederick |
| 6,854,816 B2 | 2/2005 | Milligan |
| 6,854,817 B1 | 2/2005 | Simon |
| 6,923,518 B2 | 8/2005 | Kim |
| 6,945,618 B2 | 9/2005 | Kim et al. |
| 6,988,626 B2 | 1/2006 | Varghese et al. |
| 7,090,320 B2 | 8/2006 | Chen et al. |
| 7,108,143 B1 | 9/2006 | Lin |
| 7,331,644 B2 | 2/2008 | Lowe |
| 7,331,664 B2 | 2/2008 | Lowe |
| 7,883,162 B2 | 2/2011 | Langguth et al. |
| 7,993,084 B2 | 8/2011 | Hitchcock |
| 8,002,470 B2 | 8/2011 | Cheng |
| 8,052,234 B2 | 11/2011 | Liang et al. |
| 8,231,189 B2 | 7/2012 | Liang et al. |
| 8,876,232 B2 | 11/2014 | Anderson et al. |
| 9,211,008 B2 | 12/2015 | Chen |
| 9,375,084 B2 | 6/2016 | Lachman et al. |
| 9,398,808 B2 | 7/2016 | Anderson et al. |
| 9,538,844 B2 | 1/2017 | Chen |
| 2001/0054863 A1 | 12/2001 | Uchino et al. |
| 2002/0074915 A1 | 6/2002 | Shih |
| 2002/0089272 A1 | 7/2002 | Liang |
| 2002/0180321 A1 | 12/2002 | Chen et al. |
| 2003/0071548 A1 | 4/2003 | Milligan |
| 2003/0107308 A1 | 6/2003 | Kueng et al. |
| 2003/0111942 A1 | 6/2003 | Judge et al. |
| 2004/0104651 A1 | 6/2004 | Kreft et al. |
| 2004/0145285 A1 | 7/2004 | Hwang |
| 2004/0145286 A1 | 7/2004 | Kim |
| 2004/0227441 A1 | 11/2004 | Want et al. |
| 2004/0227442 A1 | 11/2004 | Huang |
| 2004/0256333 A1 | 12/2004 | Buhlmeyer et al. |
| 2005/0218762 A1 | 10/2005 | Lammens |
| 2005/0225219 A1 | 10/2005 | Chen et al. |
| 2005/0264146 A1 | 12/2005 | Fitz |
| 2005/0285492 A1 | 12/2005 | Hu et al. |
| 2006/0226748 A1 | 10/2006 | Kinsel |
| 2008/0018213 A1 | 1/2008 | Chen et al. |
| 2008/0224583 A1 | 9/2008 | Prenter |
| 2008/0284299 A1 | 11/2008 | Chen |
| 2009/0174299 A1 | 7/2009 | Lam et al. |
| 2009/0195133 A1 | 8/2009 | Chang |
| 2010/0007255 A1 | 1/2010 | Cheng |
| 2011/0080081 A1 | 4/2011 | Klausing et al. |
| 2011/0234072 A1 | 9/2011 | Hightower |
| 2012/0013235 A1 | 1/2012 | Hisamatsu |
| 2012/0049712 A1 | 3/2012 | Lebbezoo |
| 2012/0145845 A1 | 6/2012 | Hightower |
| 2013/0106271 A1 | 5/2013 | Anderson et al. |
| 2013/0193824 A1 | 8/2013 | Koenig |
| 2013/0334766 A1 | 12/2013 | Okamoto |
| 2013/0334949 A1 | 12/2013 | Yokoyama et al. |
| 2014/0044382 A1 | 2/2014 | Chen |
| 2014/0079346 A1 | 3/2014 | Chung |
| 2014/0191645 A1 | 7/2014 | Kuba et al. |
| 2014/0265795 A1 | 9/2014 | Muller et al. |
| 2015/0275963 A1 | 10/2015 | Petersson |
| 2015/0342346 A1 | 12/2015 | Lachman et al. |
| 2017/0099947 A1 | 4/2017 | Lachman et al. |

FOREIGN PATENT DOCUMENTS

| | | |
|---|---|---|
| DE | 3643312 A1 | 10/1993 |
| DE | 20116057 U1 | 12/2001 |

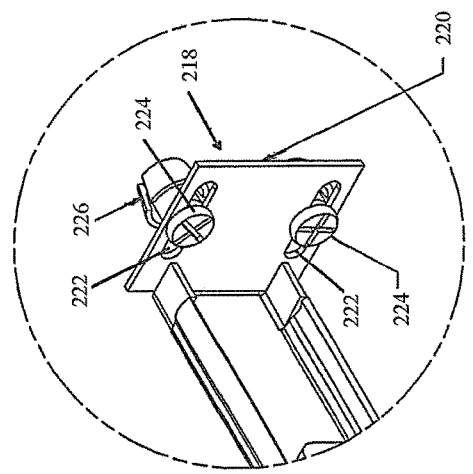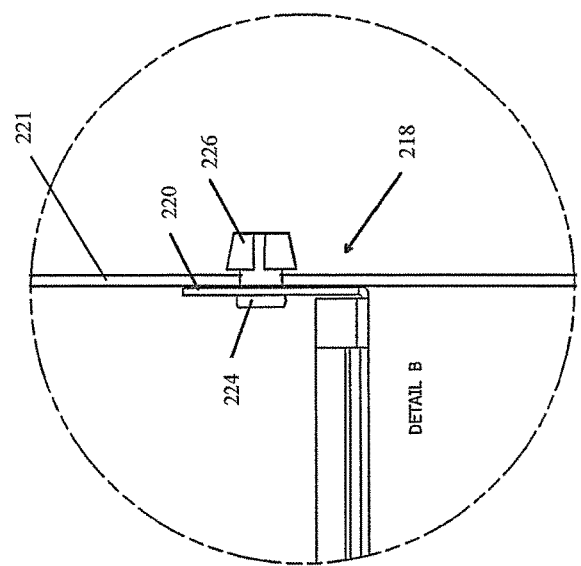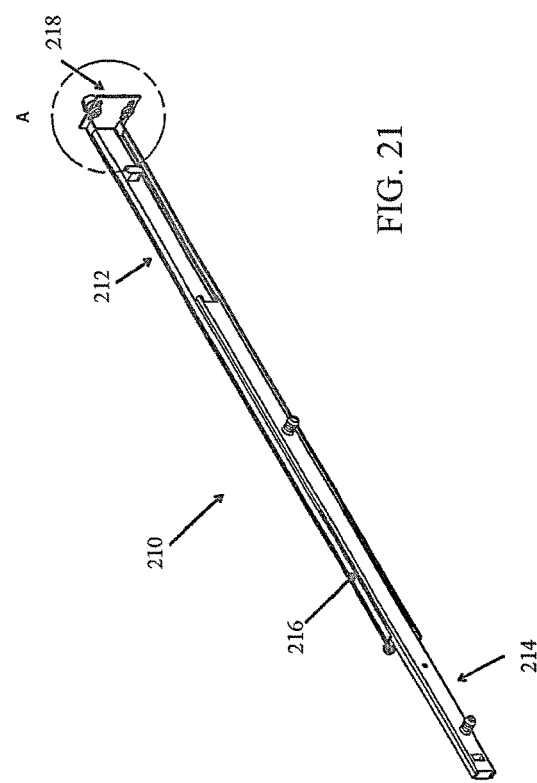
FIG. 21
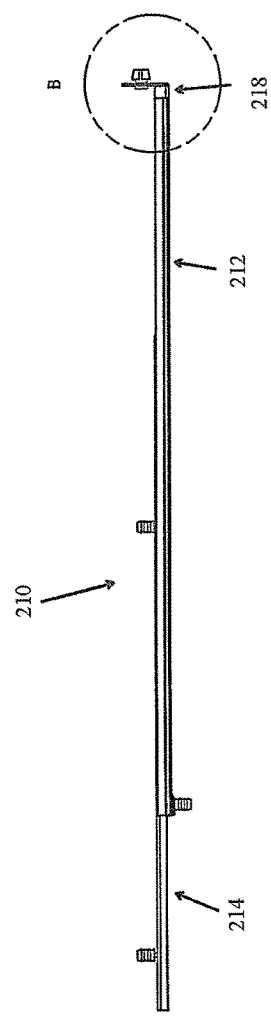
FIG. 22

DRAWER GLIDE MECHANISM

INCORPORATION BY REFERENCE TO ANY PRIORITY APPLICATIONS

This application is a continuation of U.S. patent application Ser. No. 17/384,166, filed Jul. 23, 2021, which is a continuation of U.S. patent application Ser. No. 16/703,015, filed Dec. 4, 2019, which is a continuation of U.S. patent application Ser. No. 13/783,077, filed Mar. 1, 2013, which claims benefit under 35 U.S.C. §119(e) to U.S. Provisional Patent Application No. 61/606,266, filed Mar. 2, 2012, and U.S. Provisional Patent Application No. 61/606,290, filed Mar. 2, 2012. All of the above-mentioned applications are incorporated in their entireties by reference herein. This application also incorporates in its entirety by reference U.S. Provisional Patent Application No. 61/552,128, filed Oct. 27, 2011.

BACKGROUND

Field of the Inventions

The present application relates generally to drawer glide mechanisms.

Description of the Related Art

Drawer glide mechanisms are commonly used to facilitate the opening and closing of drawers. Drawer glide mechanisms generally include a plurality of elongate guide members that slide relative to one another. The elongate guide members are often metal or plastic pieces mounted, for example, to the sides of drawers, and/or within a storage device (e.g. cabinetry).

Some common drawer glide mechanisms are referred to as epoxy glides. These types of drawer glide mechanisms are low cost, and include a single roller (e.g. wheel) on both ends of the glide mechanism. The rollers are used to allow a drawer to slide in and out of a piece of cabinetry along the guide members. The epoxy glides can be mounted to the back of a cabinetry, for example, using a single piece v-notch socket. The v-notch socket, which is generally a single plastic piece mounted to the back of a cabinetry, can receive one end of a guide member to help hold the guide member in place.

Other types of drawer glide mechanisms incorporate ball bearing guide members that allow a drawer to slide in and out in a more smooth manner. These drawer glide mechanisms often require an expensive, larger, thicker, and/or heavier two-piece socket with multiple screws or other fasteners to fasten the two-piece socket in place to the back of a storage unit. These drawer glide mechanisms are used for example in industrial settings and for high-end cabinetry where there are tight dimensional tolerances.

SUMMARY OF THE INVENTION

An aspect of at least one of the embodiments disclosed herein includes the realization that epoxy glides can often create rough, uneven drawer movement within a piece of cabinetry, due to the single rollers, loose fit of the guides, and the size/weight of a cabinet drawer.

Another aspect of at least one of the embodiments disclosed herein includes the realization that due to the high cost and labor involved with the two-piece socket and ball bearing guide, and the lack of tight tolerances often found in kitchen and bathroom cabinetry, a typical ball bearing drawer glide mechanism is not ideal for use in mass production of kitchen/bathroom cabinetry.

Therefore, it would be advantageous to have a drawer glide mechanism for kitchens/bathroom cabinetry that utilizes the advantage of ball bearing guides for smooth operation of the drawer, and also utilizes the advantage of a v-notch type socket for cost-efficiency.

Thus, in accordance with at least one embodiment described herein, a drawer glide mechanism can comprise a first elongate guide member having a distal end, a second elongate guide member nested within the first elongate guide member, a ball bearing component comprising a plurality of ball bearings between the first and second elongate guide members configured to permit movement of the second elongate guide member relative the first elongate guide member, and a v-notch socket having at least a first opening for receiving the distal end of the first elongate guide member.

Another aspect of at least one of the embodiments disclosed herein includes the realization that wood and/or other types of drawers often are warped or are otherwise misshapen and uneven. When installing a warped drawer into a cabinet, it can be difficult to properly align and install the drawer, particularly when the drawer is intended to be attached directly to one or more drawer glides.

Therefore, it would be advantageous to have a drawer glide mechanism for kitchens/bathroom cabinetry that utilizes an attachment structure that compensates for warping of drawers, and facilitates easy attachment and adjustment of the drawer within the cabinetry.

Thus, in accordance with at least one embodiment disclosed herein, a drawer glide mechanism can comprise a first elongate guide member having a distal end, a second elongate guide member nested within the first elongate guide member, the second elongate guide member having a longitudinally extending body, a fixed member protruding from and extending generally transverse to the longitudinally extending body, and a floating member extending at least partially over the fixed member, the floating member configured to slide over the first fixed member in a transverse direction relative the longitudinally extending body.

In accordance with at least another embodiment disclosed herein, a drawer system can comprise a drawer cabinet comprising a back side panel, two side panels, and a plurality of face frame components, two drawer glide mechanisms, each of the drawer glide mechanisms attached to the back side panel and comprising a first elongate guide member having a longitudinally extending body and a distal end, a second elongate guide member nested within the first elongate guide member, the second elongate guide member having a longitudinally extending body, at least one fixed member protruding from and extending generally transverse to the longitudinally extending body of the second elongate guide member, at least one floating member extending at least partially over the fixed member, the floating member configured to slide over the first fixed member in a transverse direction relative the longitudinally extending body of the second elongate guide member, a ball bearing component comprising a plurality of ball bearings between the first and second elongate guide members configured to permit longitudinal movement of the second elongate guide member relative to the first elongate guide member, a socket having a body portion, at least a first opening in the body portion, and at least one dowel portion protruding from a back side of the body portion and into the back side panel of the drawer cabinet, the socket configured to receive the distal end of the first elongate guide member, and a drawer comprising a back drawer panel, two side drawer panels, and a front drawer panel, the drawer attached to the second elongate guide member via the at least one floating member.

Another aspect of at least one of the embodiments disclosed herein includes the realization that v-notch sockets, and socket pieces in general, can often be bulky and/or expensive. Therefore, it would be advantageous to have a drawer glide mechanism, and in particular a ball bearing glide mechanism, that does not require a separate socket piece.

Thus, in accordance with at least one embodiment disclosed herein, a drawer glide mechanism can comprise a first elongate guide member having a longitudinally extending body and a distal end forming a substantially right angle relative to the longitudinally extending body, the distal end comprising a slot, a first dowel portion extending through the slot, a second dowel portion attached to the first dowel portion, the first and second dowel portions configured to slide along at least one direction within the slot, a second elongate guide member nested within the first elongate guide member, and a ball bearing component comprising a set of ball bearings between the first and second elongate guide members configured to permit movement of the second elongate guide member relative to the first elongate guide member.

In accordance with at least another embodiment disclosed herein, a drawer system can comprise a drawer cabinet comprising a back side panel, two side panels, and a plurality of face frame components, two drawer glide mechanisms, each of the drawer glide mechanisms attached to the back side panel and comprising a first elongate guide member having a longitudinally extending body and a distal end bent at a substantially right angle, the distal end comprising a slot, a first dowel portion extending through the slot of the distal end, a second dowel portion attached to the first dowel portion, the first and second dowel portions configured to slide along at least one direction within the slot, a second elongate guide member nested within the first elongate guide member, the second elongate guide member having a longitudinally extending body, at least one fixed member protruding from and extending generally transverse to the longitudinally extending body of the second elongate guide member, at least one floating member extending at least partially over the fixed member, the floating member configured to slide over the first fixed member in a transverse direction relative the longitudinally extending body of the second elongate guide member, a ball bearing component comprising a plurality of ball bearings between the first and second elongate guide members configured to permit longitudinal movement of the second elongate guide member relative to the first elongate guide member, and a drawer comprising a back drawer panel, two side drawer panels, and a front drawer panel, the drawer attached to the second elongate guide member via the at least one floating member.

BRIEF DESCRIPTION OF THE DRAWINGS

These and other features and advantages of the present embodiments will become more apparent upon reading the following detailed description and with reference to the accompanying drawings of the embodiments, in which:

FIG. 21 is a perspective and detail view of an embodiment of a drawer glide mechanism; and FIG. 22 is a top plan and detail view of the drawer glide mechanism of FIG. 21.

DETAILED DESCRIPTION OF THE PREFERRED EMBODIMENTS

Figure 1:
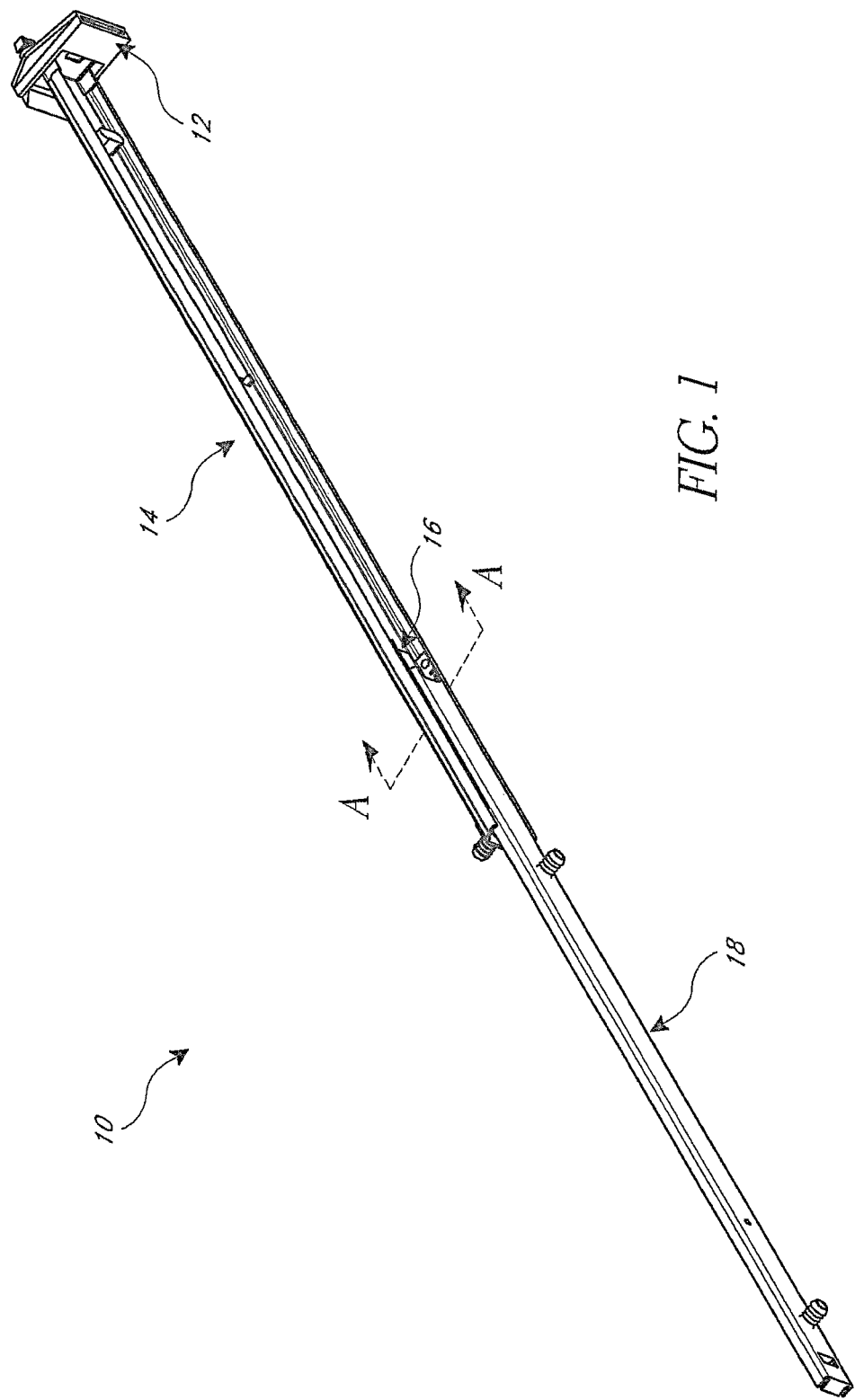
FIG. 1 is a perspective view of an embodiment of a drawer glide mechanism.
Figure 2:
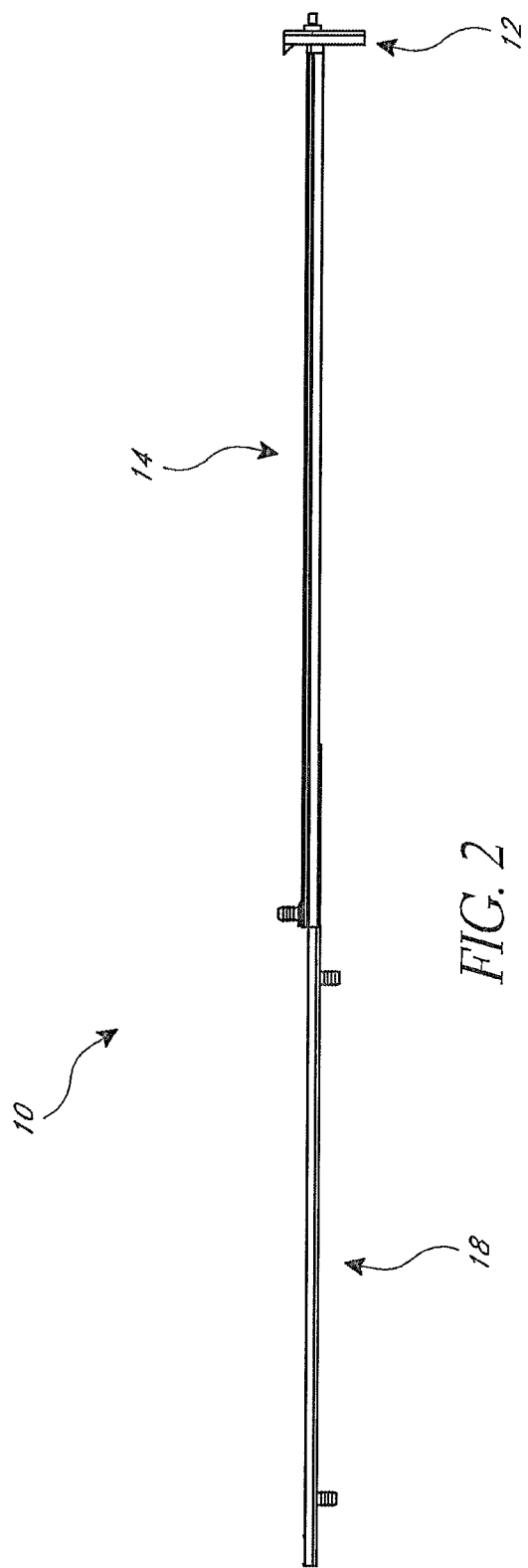
FIG. 2 is a left side elevational view of the drawer glide mechanism of FIG. 1.
Figure 3:
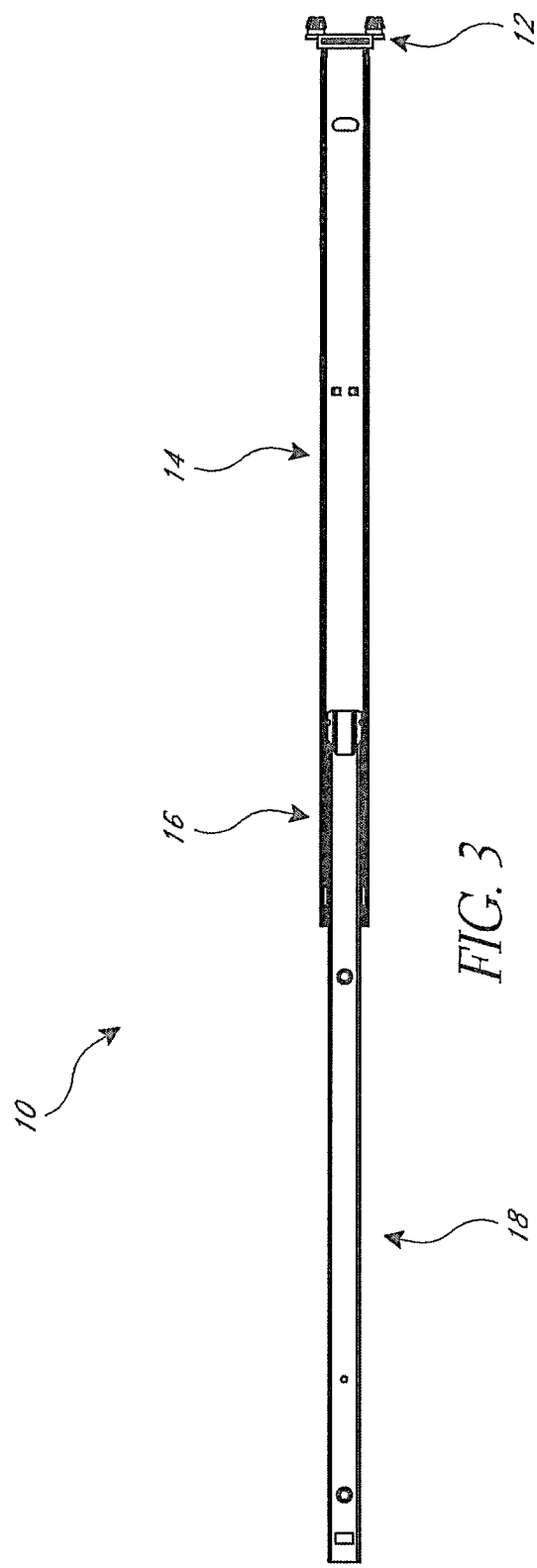
FIG. 3 is a bottom plan view of the drawer glide mechanism of FIG. 1.
Figure 4:
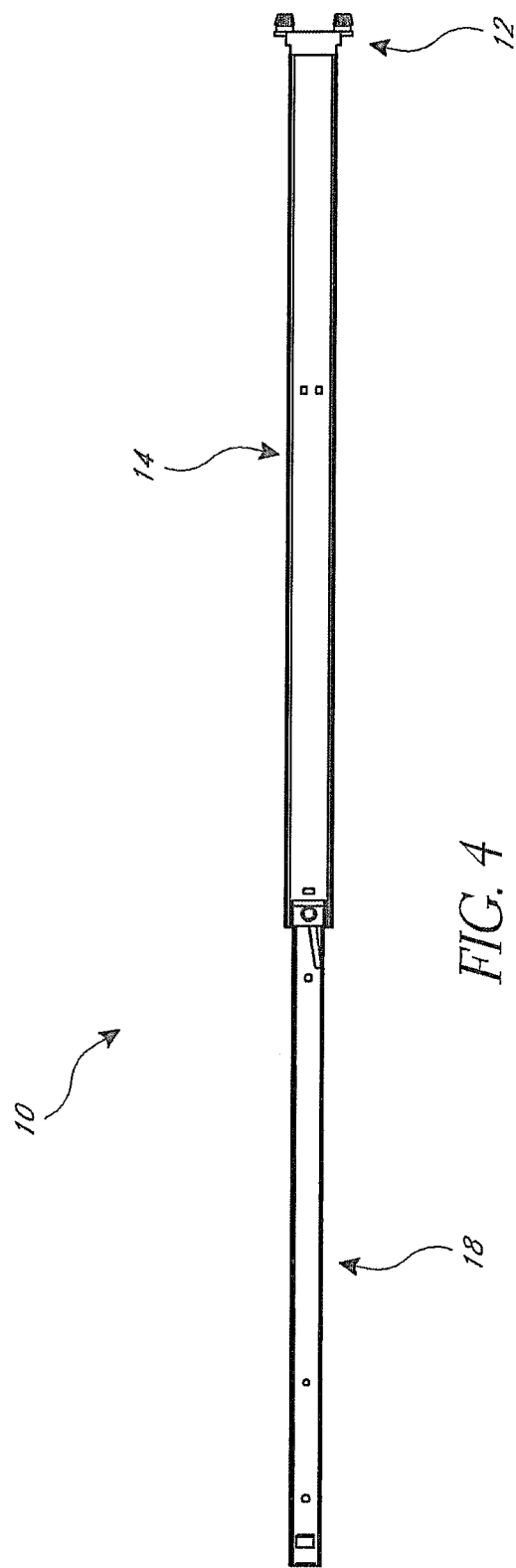
FIG. 4 is a top plan view of the drawer glide mechanism of FIG. 1.
Figure 5:
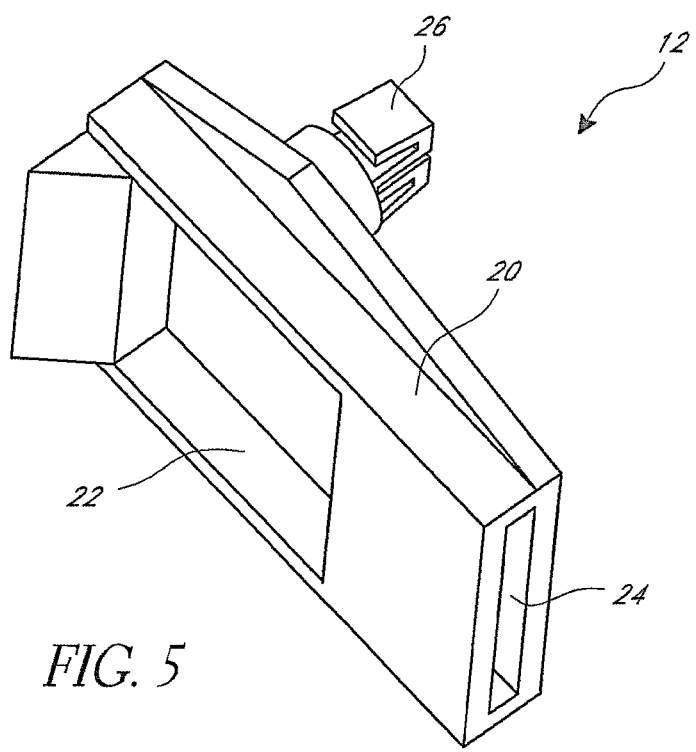
FIGS. 5-9 are views of a v-notch socket of the drawer glide mechanism of FIG. 8.
Figure 6:
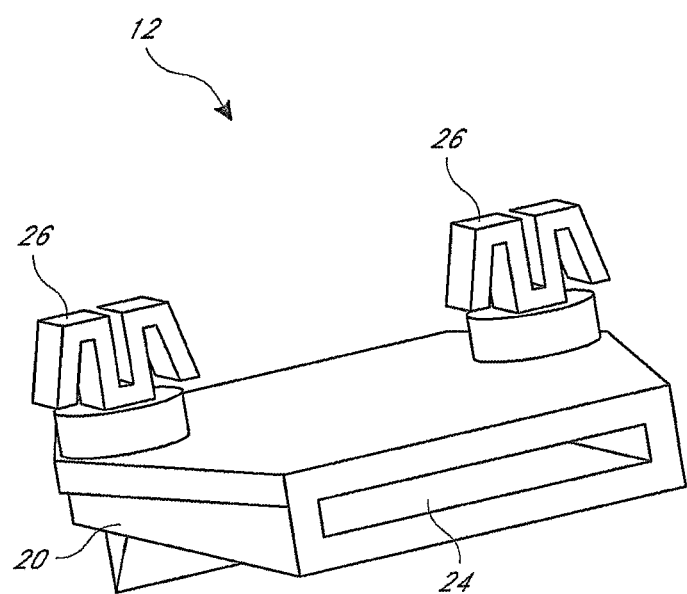
Figure 7:
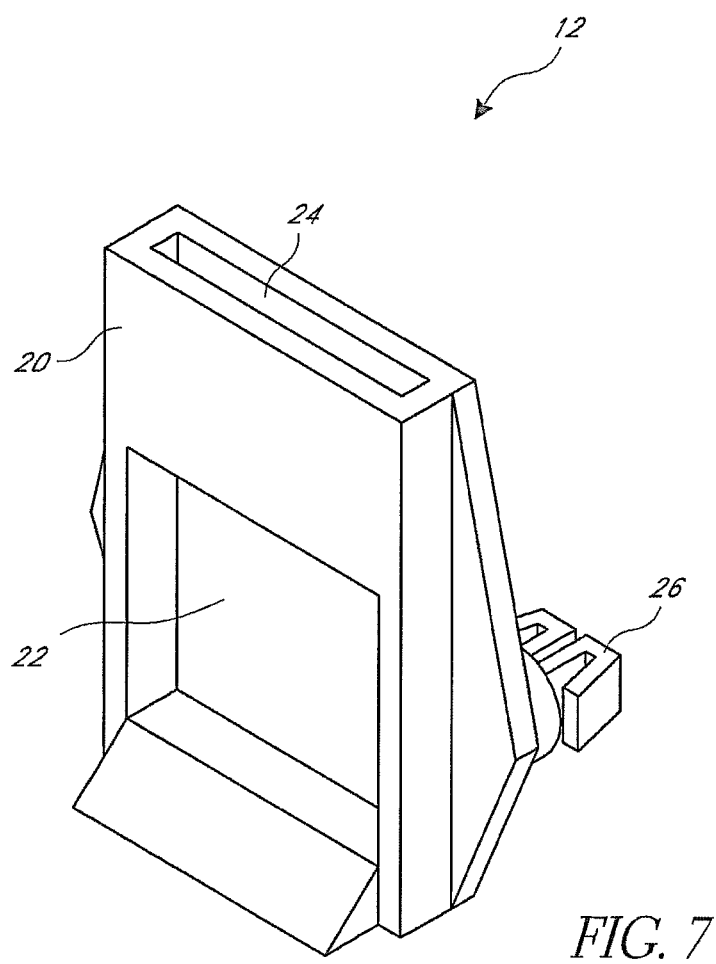
Figure 8:
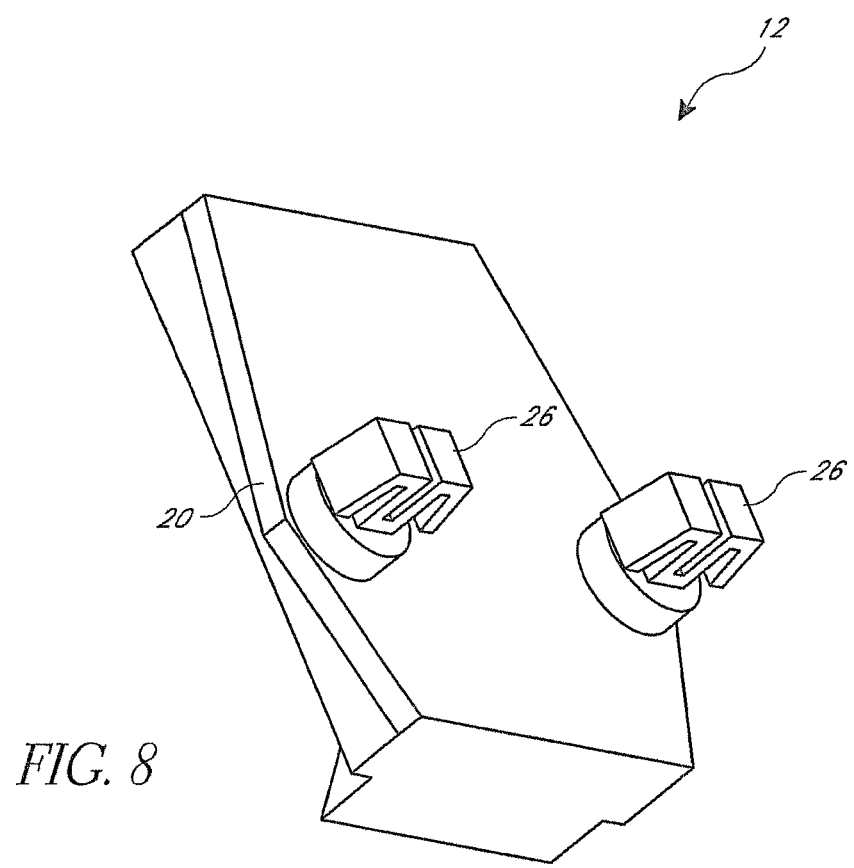

With reference to FIGS. 1-4, a drawer glide mechanism 10 can comprise a v-notch socket 12, a first elongate guide member 14, a ball bearing component 16, and a second elongate guide member 18. The first elongate guide member 14 and second elongate member 18 can comprise elongate pieces of metal, plastic, or other suitable material. The first elongate guide member 14 can be coupled (e.g. releasably coupled) to the v-notch socket 12, and/or can also be coupled to the second elongate guide member 18. For example, the second elongate guide member 18 can be nested within the first elongate guide member 14. The ball bearing component 16 can be nested between the first elongate guide member 14 and second elongate guide member 18. The second elongate guide member 18 can be free to move (e.g. glide) relative to the first elongate guide member 14 in at least one direction via the ball bearing component 16. For example, the second elongate guide member 18 can glide alongside a length the first elongate guide member 14, generally parallel to the first elongate guide member 14.

Other arrangements of the first elongate guide member 14 and second elongate guide member 18 are also possible. For example, in some embodiments the first elongate guide member 14 can be nested within the second elongate guide member 18. In some embodiments one or more of the elongate guide members 14, 18 can be telescopingly engaged with one another. In some embodiments more than two elongate guide members can be used. In some embodiments more than one ball bearing component 16 can be used.

With reference to FIGS. 5-9, the v-notch socket 12 can comprise a body portion 20, a first opening 22, a second opening 24, and at least one protruding v-notch dowel portion 26. The body portion 20 can be comprised of plastic, or other suitable material. The first opening 22 can, for example, be cut out of, or molded as part of, the body 20. The first opening 22 can be located on a front-facing portion of the v-notch socket 12. The first opening 22 can be large enough to receive a distal end of the first elongate guide member 14. The second opening 24 can, for example, be cut out of or molded as part of, the body 20. The second opening 24 can be located on a side-facing portion of the v-notch socket 12. The second opening 24 can be large enough to receive at least a portion of the distal end of the first elongate guide member 14. In some embodiments, the first and second openings 22, 24 can be continuous, and linked together, such that they form one opening and pathway through the body of the v-notch socket 12.

Figure 9:
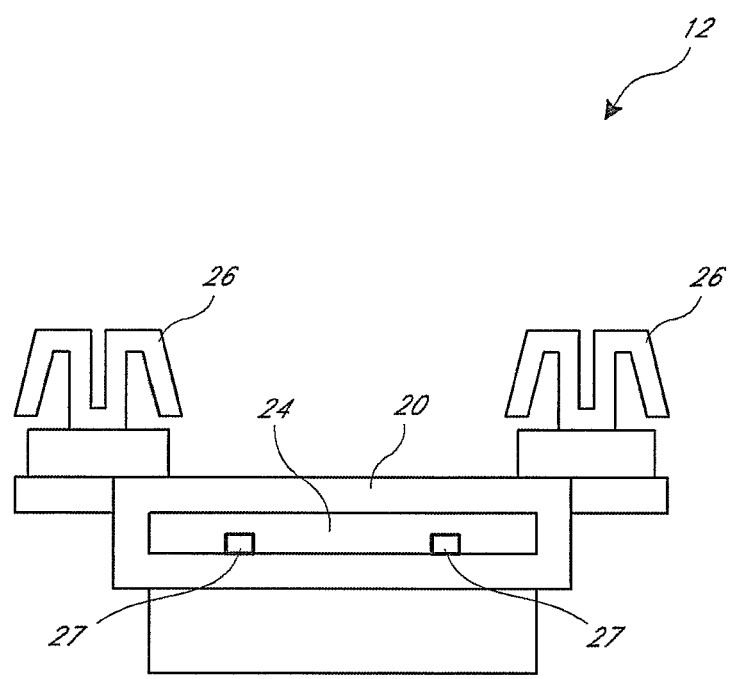

With continued reference to FIGS. 5-9, the at least one v-notch dowel portion 26 can comprise, for example, a plastic dowel piece that is integrally formed with (e.g. molded with) the body portion 20. The v-notch dowel portion 26 can extend from a back-facing portion of the v-notch socket 12. The v-notch dowel portion 26 can extend from the body 20 on an opposite side of the body 20 as the first opening 22. In some embodiments, the v-notch socket 12 can have two v-notch dowel portions 26, though other numbers are also possible. The v-notch dowel portions 26 can be configured to be inserted into the back side paneling of a drawer cabinet. Specifically, the v-notch dowel portions 26 can be configured to be inserted into a relatively thin back side drawer panel. For example, in some embodiments, the v-notch dowel portions 26 can be configured to be inserted into a thin back side drawer panel that is no greater than 5 mm in thickness. In some embodiments the v-notch dowel portions 26 can be configured to be inserted into a back side drawer panel that is no greater than 4 mm in thickness. In some embodiments the v-notch dowel portions 26 can be configured to be inserted into a back side drawer panel that is no greater than 3 mm in thickness. In some embodiments the v-notch dowel portions 26 can be configured to be inserted into a back side drawer panel that is no greater than 2 mm in thickness. Other ranges and values are also possible. Thus, at least in some embodiments, plastic v-notch dowel portions 26 and a plastic v-notch socket 12 can facilitate holding an attached metal first elongate guide member 14, metal ball bearing component 16, and metal second elongate guide member 18 in place within a drawer cabinet, even if the drawer cabinet has relatively thin paneling. With reference to FIG. 9, in some embodiments the v-notch socket 12 can include one or more tabs 27. The tabs 27 can be used to help guide a distal end of the first elongate guide member 14. The tabs 27 can be used to help generally hold (e.g. frictionally) a distal end of the first elongate guide member 14 in place and inhibit or prevent movement of the distal end of the first elongate guide member 14 relative the v-notch socket 12 in at least one direction.

Figure 10:
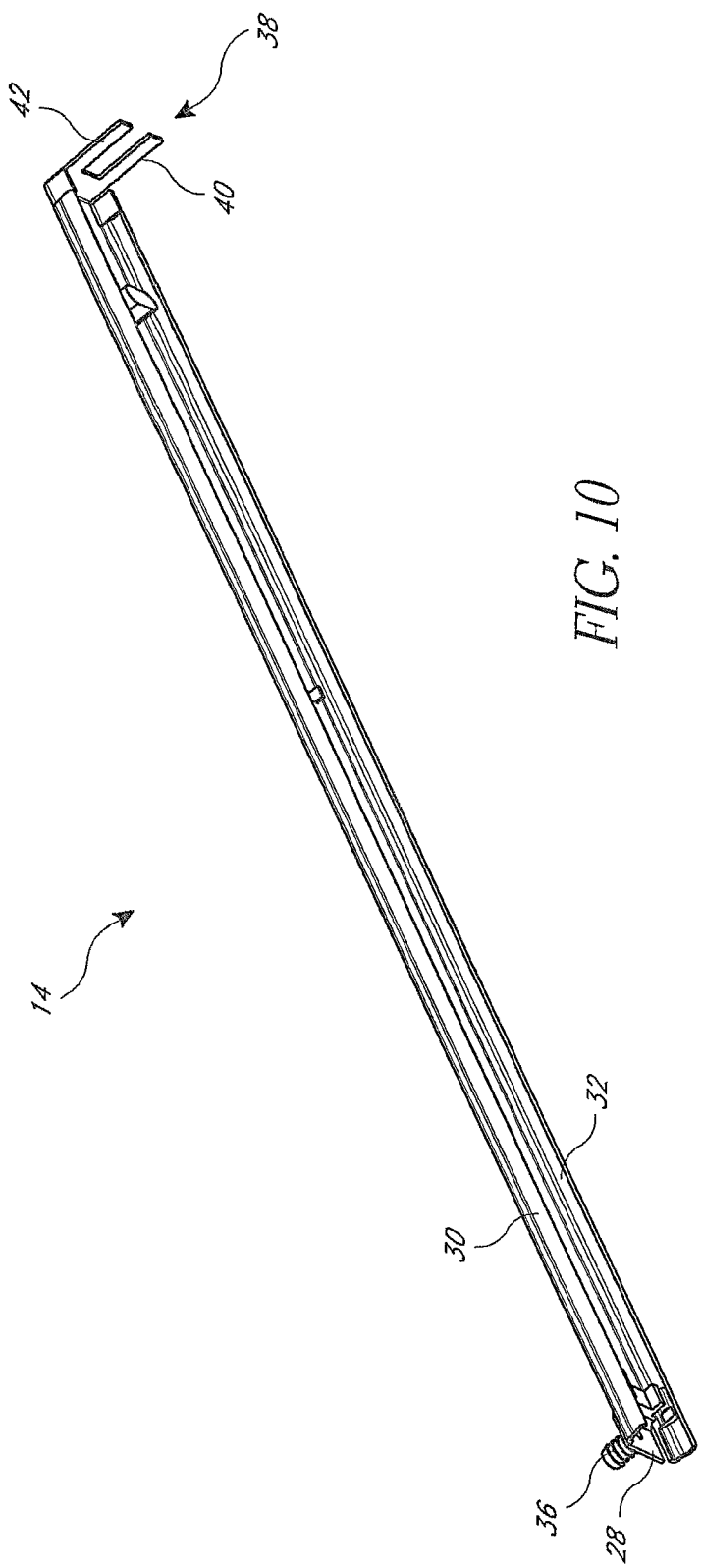
FIGS. 10 and 11 are perspective view of a first elongate guide member of the drawer glide mechanism of FIG. 1.
Figure 11:
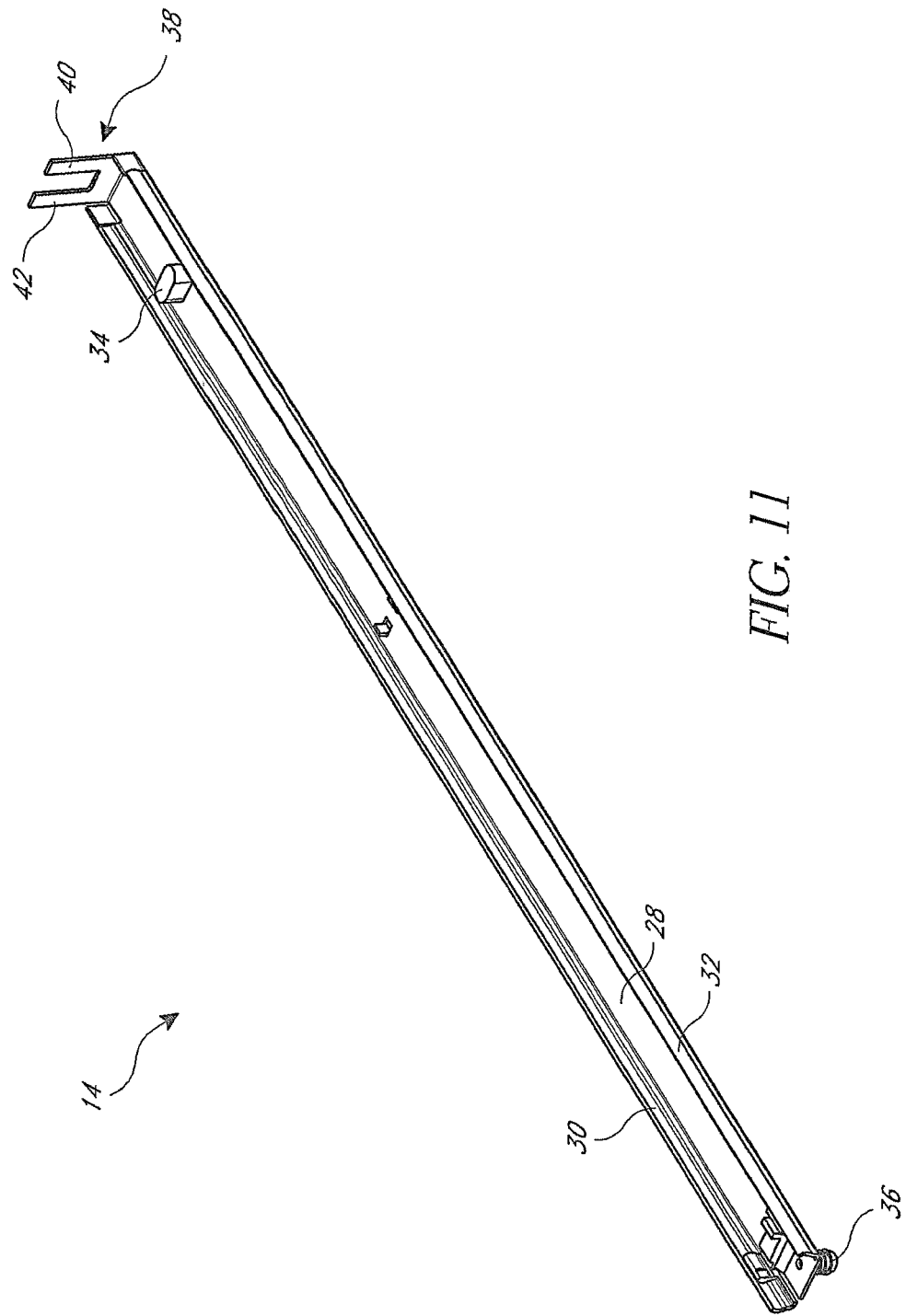

With reference to FIGS. 10 and 11, the first elongate guide member 14 can comprise a web portion 28, a first flange portion 30 extending from the web portion 28, and a second flange portion 32 extending from the web portion 28. The web portion 28, first flange portion 30, and second flange portion 32 can form a generally U-shaped profile. Other configurations and shapes for the first elongate guide member 14 are also possible. The first elongate guide member 14 can also comprise a stop member 34. The stop member 34 can comprise a piece of plastic, rubber, or other material, configured to limit relative motion between the first elongate guide member 14 and second elongate guide member 18. The stop member 34 can be located generally at a distal end of the first elongate guide member 14, though other locations are also possible.

With continued reference to FIGS. 10 and 11, the first elongate guide member 14 can further comprise a sidewall attachment mechanism 36. The sidewall attachment mechanism 36 can comprise, for example, a plastic dowel that is rigidly affixed to one side of the first elongate guide member 14. The sidewall attachment mechanism 36 can be used, for example, to attach the first elongate guide member 14 to the inside side paneling of a drawer cabinet. Thus, in some embodiments, both the v-notch dowel portions 26 described above, as well as the sidewall attachment mechanism 36, can be used to help attach and/or generally fix the position and/or orientation of the first elongate guide mechanism 36 within a drawer cabinet.

With continued reference to FIGS. 10 and 11, the first elongate guide member 14 can comprise a distal end 38 that is bent relative to the generally longitudinally extending remaining portion of the first elongate guide member 14. For example, the distal end 38 can be bent at a generally 90 degree angle relative to the rest of the elongate guide member 14. The distal end 38 can be bent, for example, inwardly such that it will extend directly behind a drawer when the drawer is attached to the elongate guide members 14, 18. In some embodiments the distal end 38 can have a generally fork-shaped configuration, such that the distal end has both a first forked member 40 and a second forked member 42. In some embodiments the forked-shaped configuration can facilitate attachment of the distal end 38 into the first opening 22 of the v-notch socket 12 described above.

Figure 12:
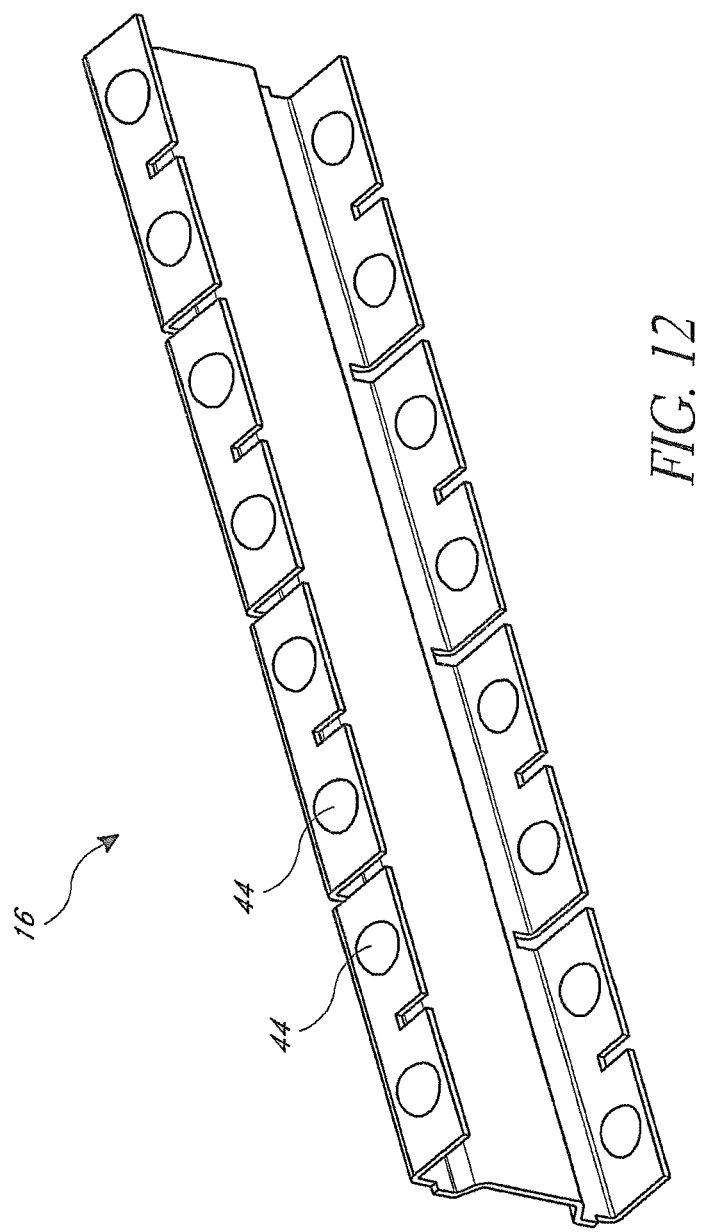
FIG. 12 is a perspective view of a ball bearing component of the drawer glide mechanism of FIG. 1.

With reference to FIG. 12, and as described above, the drawer glide mechanism 10 can comprise a ball bearing component 16 (e.g. what is commonly referred to as a race). The ball bearing component 16 can comprise a plurality of ball bearing rollers 44. The ball bearing rollers 44 can be spaced apart from one another and located along opposing sides of the ball bearing component 16. The ball bearing component 16 can be nested between the first elongate guide member 14 and second elongate guide member 18 so as to facilitate a smooth gliding motion between the first elongate guide member 14 and second elongate guide member 18.

With reference to FIGS. 12A-15, the second elongate guide member 18 can comprise a web portion 46, a first flange portion 48 extending from web portion 46, and a second flange portion 50 extending from web portion 46. The web portion 46, first flange portion 48, and second flange portion 50 can form a generally U-shaped profile. Other configurations and shapes for the second elongate guide member 18 are also possible.

Figure 12A:
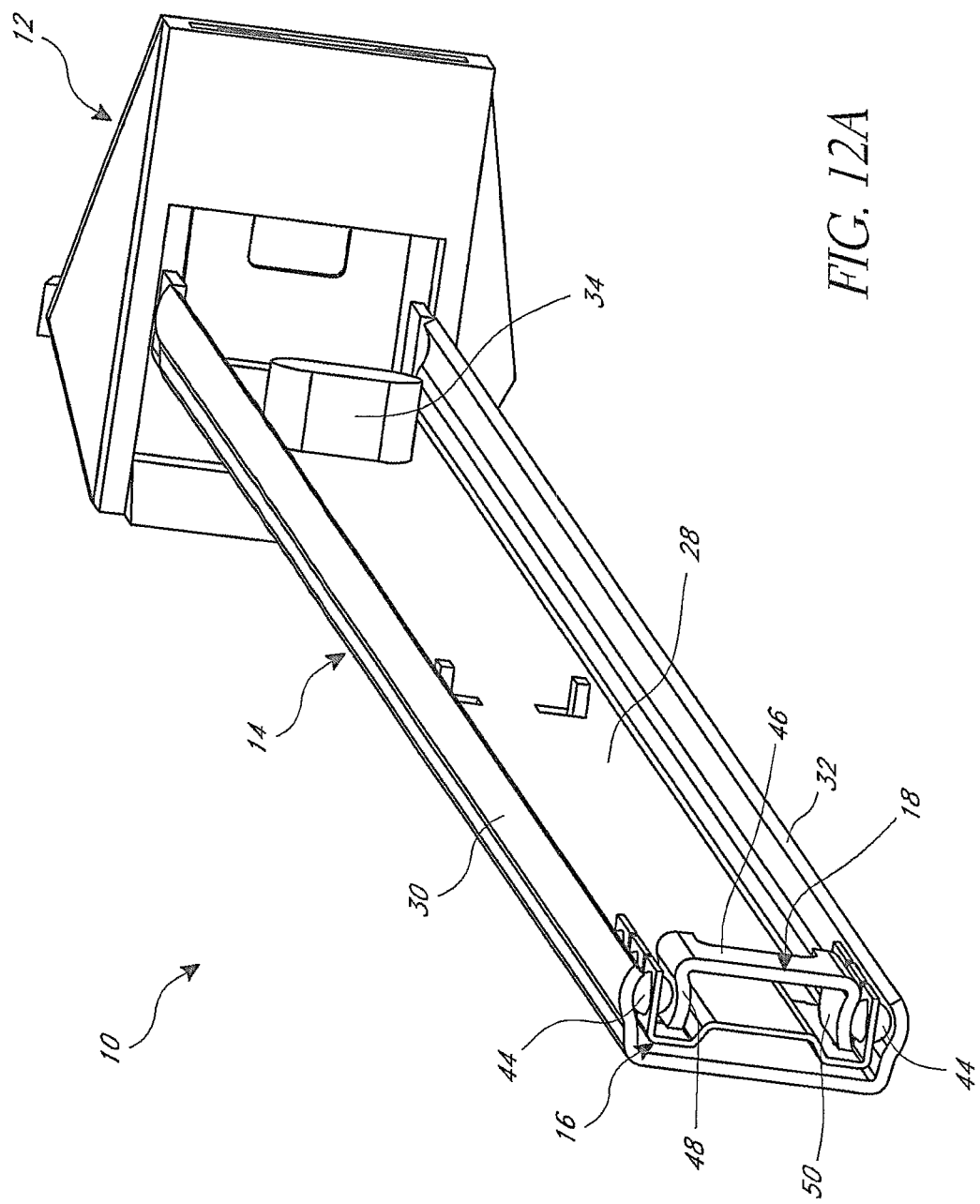
FIG. 12A is a perspective view of the cross-section taken along line A-A in FIG. 1.

As illustrated in FIG. 12A, the drawer glide mechanism 10 can optimally and advantageously include components that are nested and captured within one another, so as to severely restrict or entirely prohibit relative movement of components. For example, as illustrated in FIG. 12A, the first elongate guide member 14 can include the web portion 28 and first and second flange portions 30, 32. In some embodiments the first flange portion 30 can be shaped so as to curve over one set of the ball bearings 44 along the ball bearing component 16. Similarly, the second flange portion 32 can be shaped so as to curve over the other, opposite set of ball bearings 44 along the ball bearing component 16. Additionally, the second elongate guide member 18 can include the web portion 46 and first and second flange portions 48, 50. In some embodiments the first flange portion 48 can be shaped so as to curve over one set of ball bearings 44 along the ball bearing component 16. Similarly, the second flange portion 50 can be shaped so as to curve over the other, opposite set of ball bearings 44 along the ball bearing component 16. This curvature of the first flange portions 30, 48, and the second flange portions 32, 50 effectively captures the second elongate guide member 18 within the ball bearing component 16, and captures the ball bearing component 16 within the first elongate guide member 14. The overall capturing of these components severely restricts or entirely prohibits the second elongate guide member 18 from moving away from the first elongate guide member 14 in any direction other than along a path parallel to the second elongate guide member provided by the ball bearing component 16. Thus, the only relative movement of the first elongate guide member 14 and second elongate guide member 18 that is allowed is the relative sliding of the guide members 14, 18 along parallel paths. This arrangement advantageously provides for smooth operation.

Figure 13:
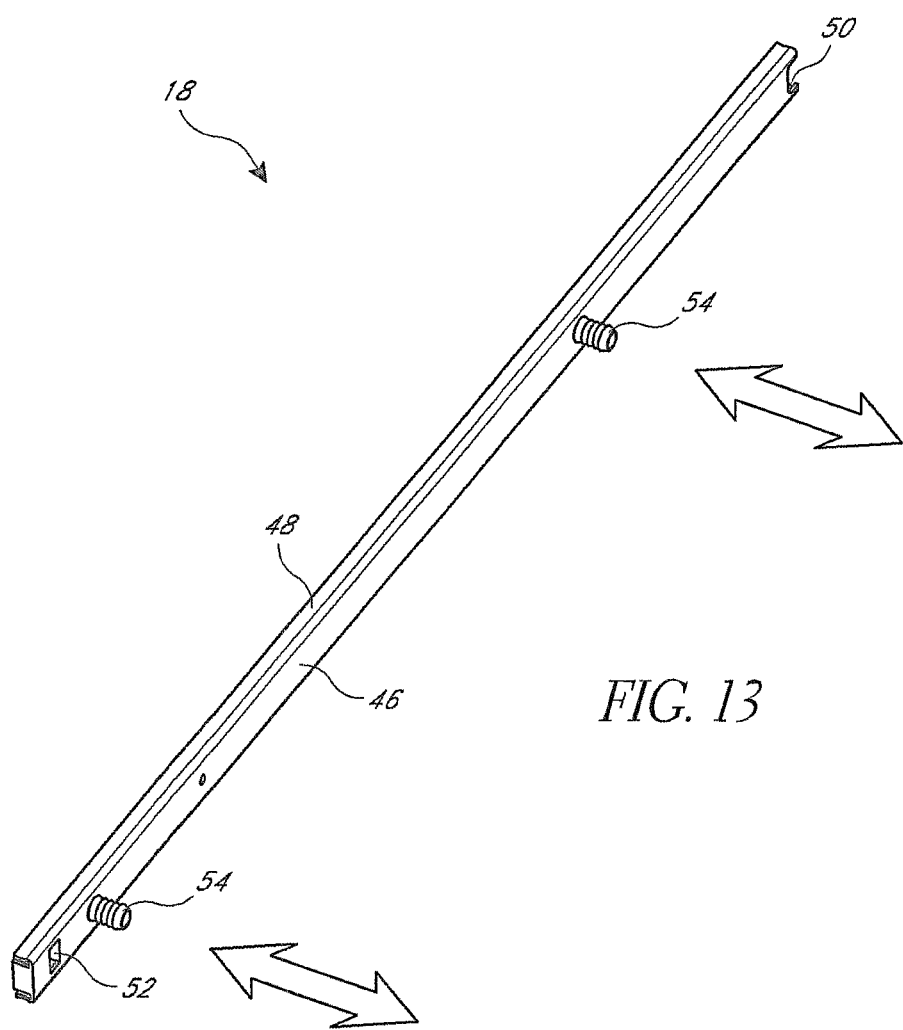
FIGS. 13 is a perspective view of a second elongate guide member of the drawer glide mechanism of FIG. 1, illustrating a plurality of fixed and floating members attached thereto.
Figure 14:
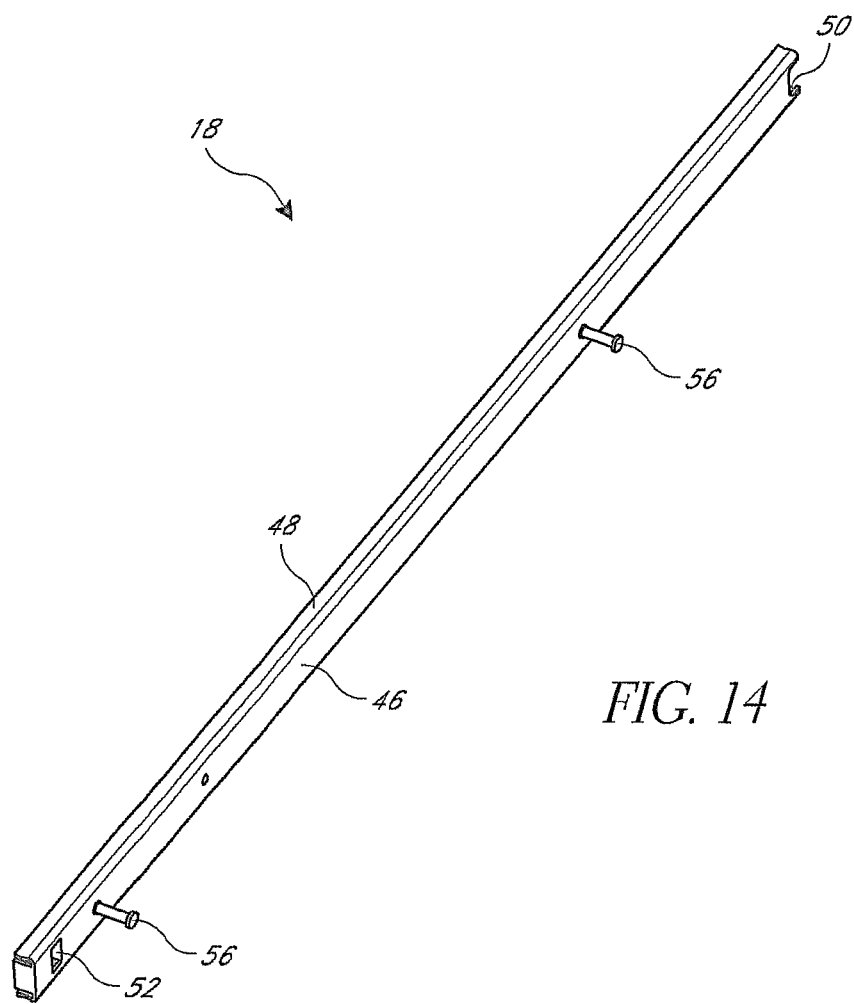
FIG. 14 is a perspective view of the second elongate guide member of the drawer glide mechanism of FIG. 1, illustrating removal of the floating members, with the fixed members remaining.
Figure 15:
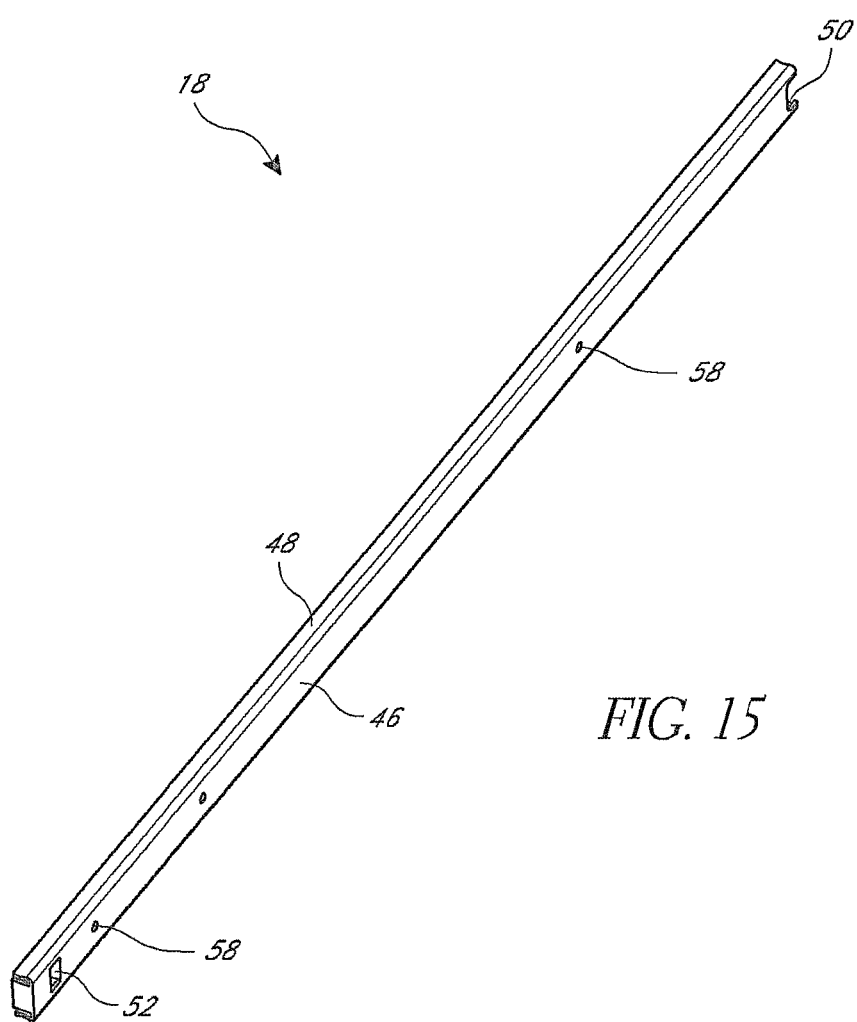
FIG. 15 is a perspective view of the second elongate guide member of the drawer glide mechanism of FIG. 1, illustrating removal of both the fixed and floating members.

With reference to FIGS. 13-15, the second elongate guide member 18 can also comprise at least one slot 52. The slot 52 can be located, for example, along a distal end of the second elongate guide member 18. The slot 52 can be used to allow for adjustability of an attached drawer. For example, the vertical slot 52 can allow for vertical adjustment of a drawer that is attached to the second elongate guide member 18. In some embodiments a fastener or other device can be inserted through the slot 52. Because of the size and shape of the slot 52, the fastener or other device can slide vertically up and down within the slot 52, thus allowing relative movement of the drawer to the second elongate guide member 18.

With reference to FIGS. 13-17, the drawer glide mechanism 10 can also comprise one or more structures that are adjustable to compensate for variations in drawer size, shape, and/or warping. For example, the drawer glide mechanism 10 can comprise at least one floating member 54, and at least one fixed member 56. The floating member 54 can be configured to attach directly to the side of a drawer, as well as to be attached, in a floating manner, to the fixed member 56. The fixed member 56 can be rigidly attached to, or integrally formed with, one or more of the first elongate guide member 14 and second elongate guide member 18. For example, a plurality of floating members 54 can comprise plastic dowels, and a plurality of fixed members 56 can comprise metal pins. The fixed members 56 can be attached to (e.g. welded to) locations 58 along the second elongate guide member 18, as seen in FIG. 15. The fixed members 56 can be spaced apart longitudinally along a length of the second elongate guide member 18. In some embodiments, more than two fixed members 56 can be used.

Figure 16A:
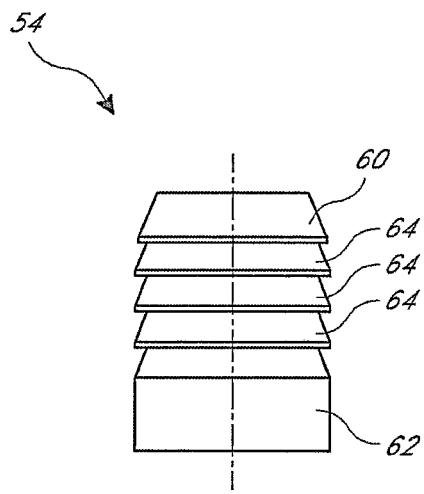
FIG. 16A is a front view of one of the floating members.
Figure 16B:
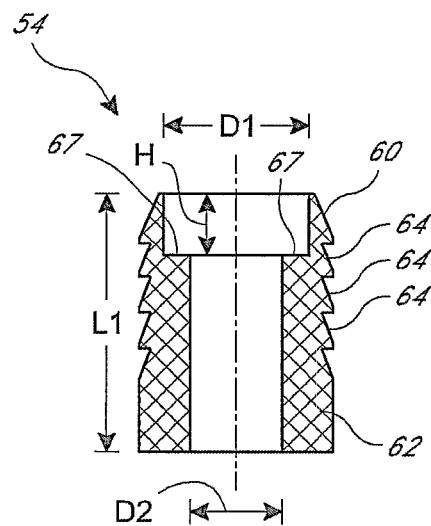
FIG. 16B is a cross-sectional view of the floating member of FIG. 16A.
Figure 16C:
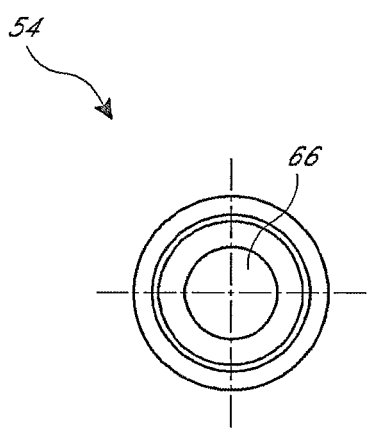
FIG. 16C is a bottom plan view of the floating member of FIG. 16A.

With reference to FIGS. 16A-C, in some embodiments the floating member 54 can comprise a first end 60, a second end 62, and a plurality of ridges 64 between the first end 60 and second end 62. The ridges 64 can be used to facilitate attachment of the floating member 54 to the side paneling of a drawer. The floating members 54 can be configured to be inserted into the side paneling of a drawer. Specifically, the floating members 54 can be configured to be inserted into a relatively thin side panel of a drawer. For example, in some embodiments, the floating members 54 can be configured to be inserted into a thin side paneling of a drawer that is no greater than 5 mm in thickness. In some embodiments the floating members 54 can be configured to be inserted into the side paneling of a drawer that is no greater than 4 mm in thickness. In some embodiments the floating members 54 can be configured to be inserted into the side paneling of a drawer that is no greater than 3 mm in thickness. In some embodiments the floating members 54 can be configured to be inserted into the side paneling of a drawer that is no greater than 2mm in thickness. Other ranges and values are also possible.

In some embodiments the floating member 54 can have an overall length "L1" of no greater than 12 mm. In some embodiments the floating member 54 can have an overall length "L1" of no greater than 10 mm. In some embodiments the floating member 54 can have an overall length "L1" of no greater than 8 mm. Other ranges and values are also possible.

Figure 17:
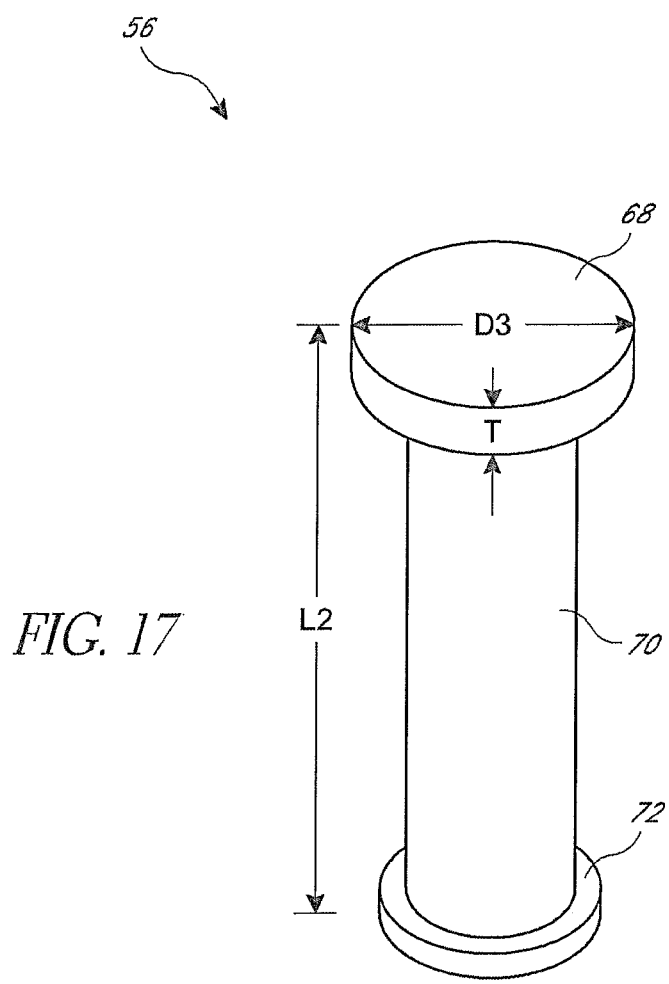
FIG. 17 is a perspective view of one of the fixed members.
Figure 17A:
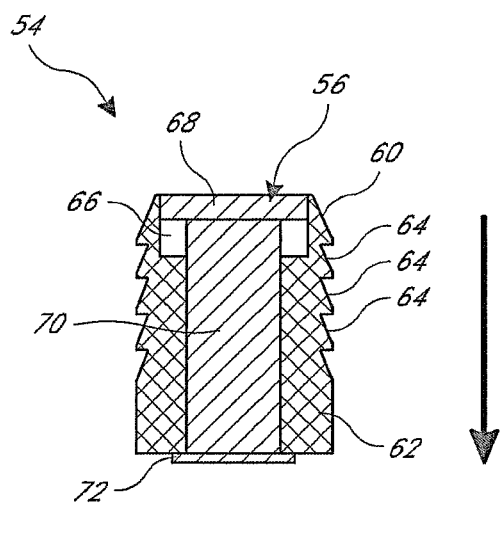
FIGS. 17A and 17B are cross-sectional views illustrating two different positions of one of the fixed and floating members.
Figure 17B:
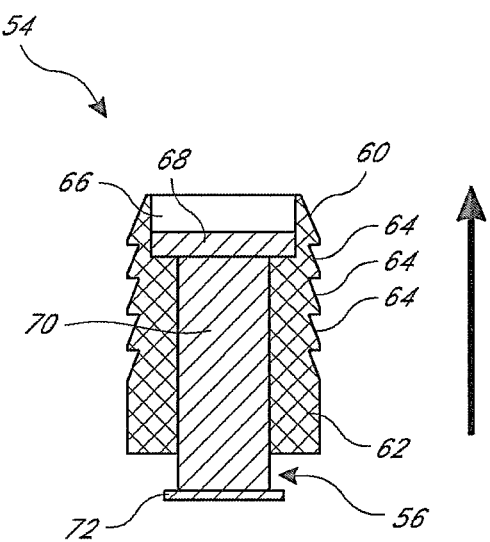

With reference to FIGS. 16B, 17A, and 17B, the floating member 54 can include at least one opening 66. In some embodiments the opening 66 can extend entirely through the floating member 54. For example, the opening 66 can extend from the first end 60 through to the second end 62. The opening 66 can be shaped and/or sized to accommodate one of the fixed members 56. For example, and as illustrated in FIG. 16B, the opening 66 can have a first diameter D1 near the first end 60 and a second, smaller diameter D2 near the second end 62. The two diameters D1, D2 can form ledges 67 within the floating member 54. The opening 66 can also have a length "H" where the opening 66 includes the first diameter D1.

As illustrated in FIG. 17, the fixed member 56 can comprise a first portion 68, a second portion 70, and a third portion 72. In some embodiments the fixed member 56 can have an overall length "L2" of no greater than 12 mm. In some embodiments the fixed member 56 can have an overall length "L2" of no greater than 10 mm. In some embodiments the fixed member 56 can have an overall length "L2" of no greater than 8 mm. Other ranges and values are also possible. In some embodiments the third portion 72 can be attached (e.g. via welding) to the locations 58 shown in FIG. 15. In some embodiments the first portion 68 can have a diameter D3. The diameter D3 can be larger than that of D2, but no greater than that of D1. The first portion 68 can also comprise a length "T". In some embodiments the length "T" can be smaller than the length "H."

With reference to FIGS. 16B, 17, 17A, and 17B, when the fixed member 56 is positioned within the floating member 54, the first portion 68 can sit within the portion of the opening 66 having the length "H." Because the diameter D3 of the first portion 68 of fixed member 56 is larger than the diameter D2 of the opening 66, the ledges 67 can work to prevent the floating member 54 from moving relative to the fixed member 56 past a fixed point. Thus, the floating member 54 can be limited in its movement in at least one direction (e.g. away from the second elongate guide member 18) due to the ledges 67. The floating member 54 can also be limited in its movement in a second direction (e.g. towards the second elongate guide member 18) by the floating member 54 contacting the first elongate guide member 14. The arrows in FIG. 13 illustrate available directions of movement of the floating members 54.

With reference to FIGS. 16B, 17, 17A, and 17B, because the length "H" of the opening 66 in the floating member 54 is larger than the length "T" of the first portion 68 of the fixed member 56, it is possible for the floating member 54 to slide relative to the fixed member 56 without the first portion 68 of the fixed member 56 ever extending out of the floating member 54. In some embodiments, for example, the ratio of the length "H" to the length "T" can be between approximately 1.0 and 1.5. In some embodiments the ratio of the length "H" to the length "T" can be between approximately 1.0 and 2.0. In some embodiments the ratio of the length "H" to the length "T" can be between approximately 1.0 and 3.0. Other values and ranges are also possible.

As illustrated by the arrows in FIG. 13, 17A, and 17B, the movement of the floating member 54 can be generally transverse to the second elongate member 18. This movement permits adjustability and compensation for drawer warping along the side of the drawer. For example, and as described above, often times a drawer will be slightly warped and/or otherwise misshaped. When installing the drawer, the floating members 54 can be inserted into the side paneling of the drawer. Because one end of the drawer may be sticking out farther than another due to warping, the floating members 54 may end up moving out to different lengths along the arrow directions in FIG. 13. This allows the drawer to easily be attached to the second elongate guide member 18. Additionally, the use of floating members 54 and fixed members 56 allows for self-correction and self-adjustment of the drawer and drawer glide mechanism 10. Thus, the floating members 54 do not require additional mechanical adjustments once the drawer is installed. Rather, the very nature of the floating members 54 described above permits automatic self-adjustment, since the floating member 54 will slide over the fixed members 56 as needed to compensate for any warping in the drawer.

Figure 18:
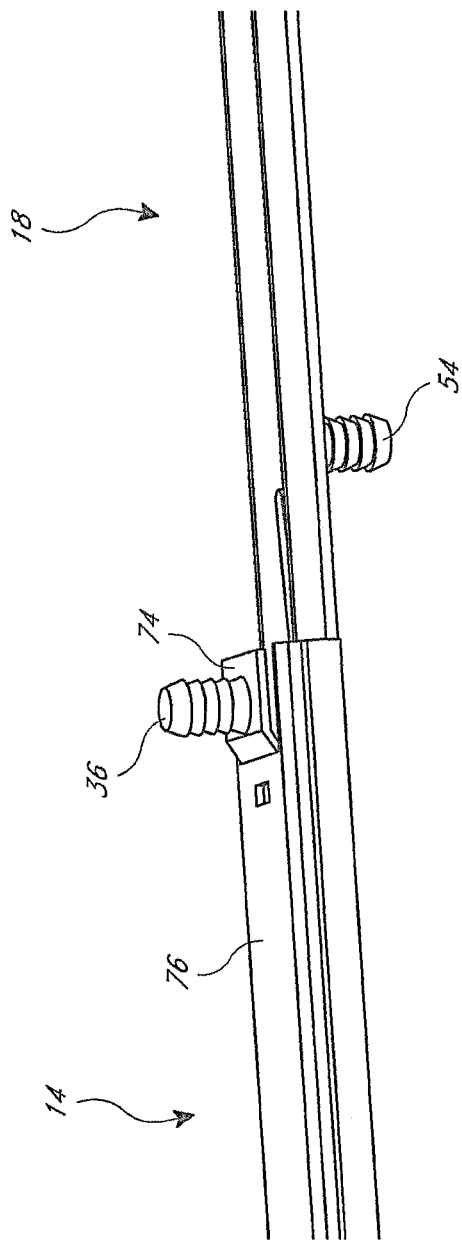
FIG. 18 is a partial perspective view of the drawer glide mechanism of FIG. 1, illustrating an embossed portion on a distal end of the first elongate guide member.

With reference to FIG. 18, the drawer glide mechanism 10 can also comprise at least one embossed portion 74 for spacing purposes when installing the drawer glide mechanism 10 within a drawer cabinet. For example, the drawer glide mechanism 10 can comprise an embossed portion 74 located generally at a distal end of the first elongate guide member 14. The embossed portion 74 can comprise a raised piece of metal along the first elongate guide member 14. The embossed portion 74 can act as a spacer within the interior of a drawer cabinet. For example, the embossed portion 74 can create a spacing between the first elongate guide member 14 and an interior side panel surface of the drawer cabinet. This spacing can facilitate installation of the drawer glide mechanism 10, and help to prevent unwanted friction or contact between various components of the drawer glide mechanism 10, drawer, and/or drawer cabinet.

Figure 19:
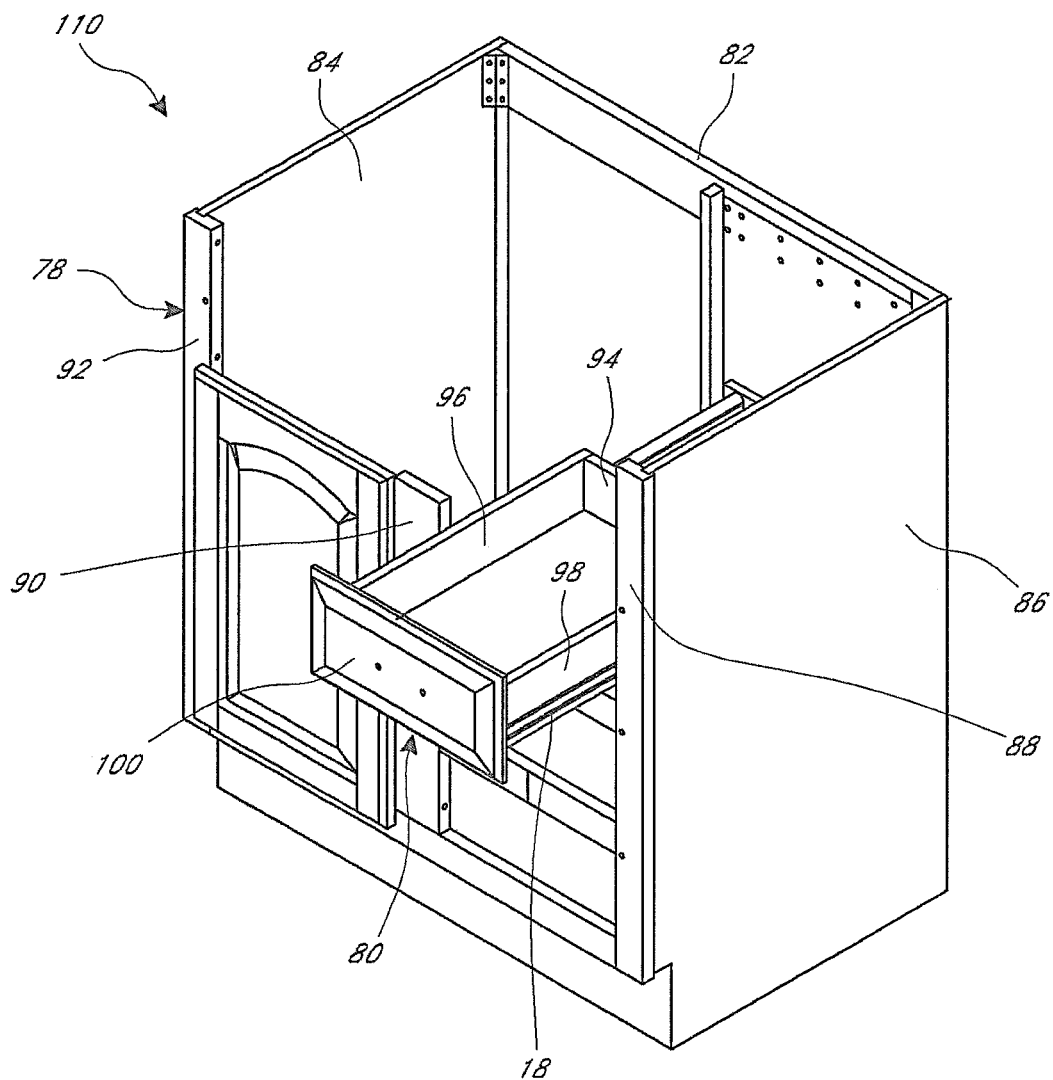
FIG. 19 is a top plan view of an embodiment of a drawer cabinet system including the drawer glide mechanism of FIG. 1.
Figure 20:
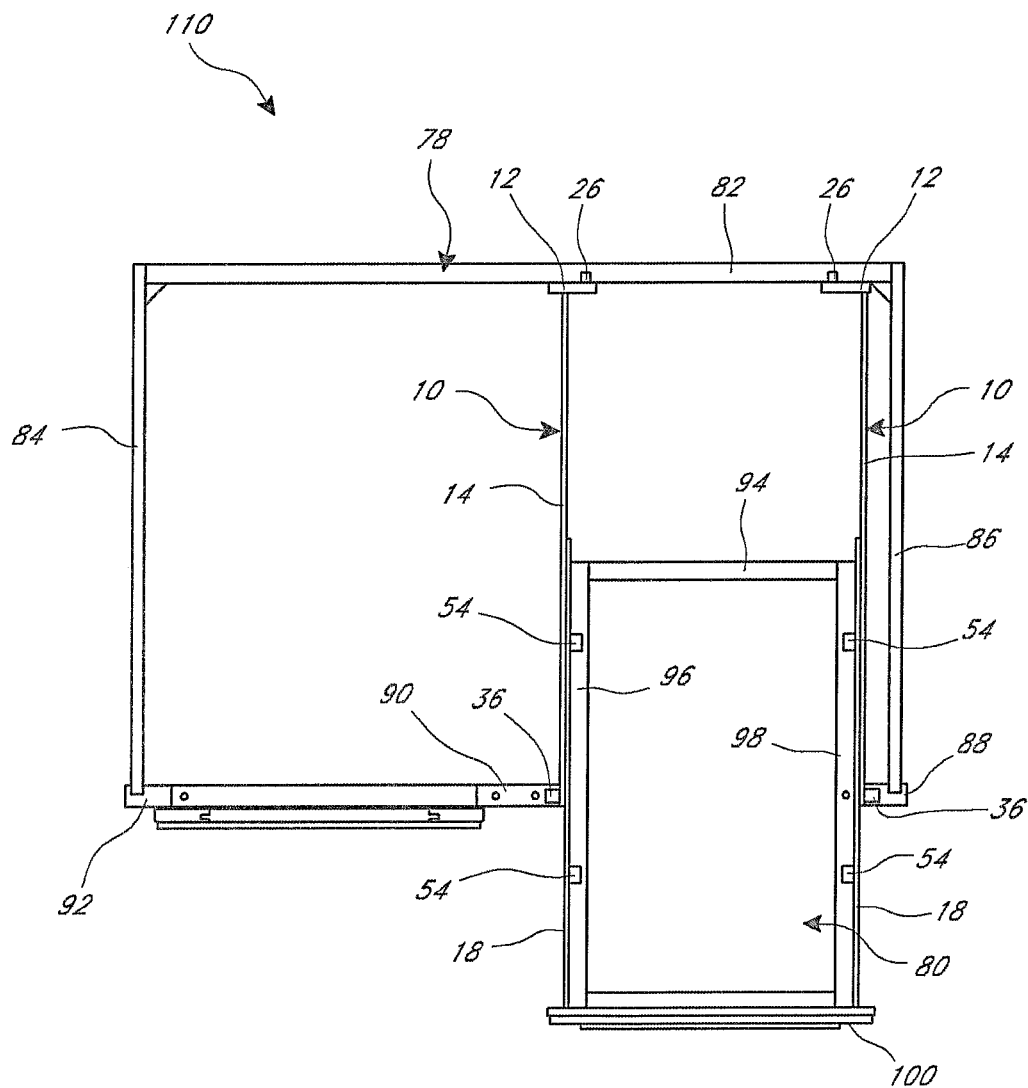
FIG. 20 is a perspective view of the drawer cabinet system of FIG. 19

With reference to FIGS. 19 and 20, an embodiment of a drawer system 110 can include two drawer glide mechanisms 10, a drawer cabinet 78, and a drawer 80. The drawer cabinet 78 can include a back side panel 82 and at least two sidewall panels 84, 86. The two drawer glide mechanisms 10 can be attached to the back side panel 82. For example, and as described above, the drawer glide mechanisms 10 can include dowel portions 26 that are configured to extend into the back side panel 82. The dowel portions 26 can hold the v-notch sockets 12 in place. In embodiments where the drawer cabinet 110 is a face frame cabinet, the drawer cabinet 78 can also include one or more face frame components. For example, and as illustrated in FIGS. 19 and 20, the drawer cabinet 78 can include face frame components 88, 90, and 92. The face frame components 88, 90, 92 can provide a framework within which one or more drawers or cabinet doors can be fitted. Additionally, the face frame components 88 and 90 can be used to anchor the first elongate guide member 14. For example, and with reference to FIGS. 18 and 20, the sidewall attachment mechanisms 36 described above can be inserted into the face frame components 88 and 90. The sidewall attachment mechanisms 36 can be inserted such that the face frame components 88 and 90 are generally flush with the embossed portion 74 of the first elongate guide member 14.

With continued reference to FIGS. 19 and 20, the drawer 80 can include a back drawer panel 94, two side drawer panels 96, 98, and a front drawer panel 100. The drawer glide mechanisms 10 can be attached to the drawer 80 via the floating members 54 and fixed members 56 described above. For example, and with reference to FIG. 20, the floating members 54 can be inserted into the side drawer panels 96, 98. The floating members 54 and fixed members 56 can accommodate for any warped portions of the side drawer panels 96, 98. As illustrated in FIG. 19, the drawer glide mechanisms 10 can permit the drawer 80 to be moved in and out of the drawer cabinet 78. When the drawer 80 is moved into the drawer cabinet 78, the front drawer panel 100 can rest against portions of the face frame components 88, 90.

While the embodiment of the drawer system 110 illustrated in FIGS. 19 and 20 is shown having drawer glide mechanisms 10 that are used in a face frame drawer cabinet 78, the drawer glide mechanisms 10 can also be used in frameless cabinets. For example, the drawer glide mechanisms 10 can be attached to the back side paneling of a frameless drawer cabinet with the v-notch socket 12, as well as to one or more side panels or other structures within a frameless cabinet. Thus, the drawer glide mechanism 10 can be used in a variety of settings within different types of kitchen and bathroom cabinets to facilitate drawer installation and movement.

Overall, the drawer glide mechanism 10 advantageously combines the low cost of an epoxy glide with the high performance of a ball bearing glide. This enables ease of manufacturing and assembly, labor and time savings, cost reduction, and results in drawers that operate and move smoothly within kitchen or bathroom cabinetry.

For example, and as described above, epoxy glides are low cost, and include a single roller (e.g. wheel) on both ends of the glide mechanism. The rollers are used to allow the drawer to slide in and out of a piece of cabinetry along the guide members. The epoxy guides do not utilize capturing of components to severely restrict or entirely prohibit relative movement of components. Rather, the guides of an epoxy glide are set loosely within one another such that one guide member can unintentionally move relative the other during the operation, often resulting in uneven and wobbly drawer movement. Epoxy glides include an inner guide member and an outer guide member. The inner guide member can sit at least in part within the outer guide member, such that the roller on each guide member contacts the other opposing guide member. However, in this arrangement it is possible for the inner guide member to fall off of or slip away from an outer guide member in at least one direction, causing the rollers to lose at least partial contact with the guide members, and for the drawer movement to become unstable and non-linear.

The ball bearing guides, on the other hand, are often bulky, expensive, and require two-piece sockets and/or additional fasteners (e.g. bolts) to support them within a storage compartment. These guides are often designed for use in industrial settings, such as for storage of computer components. They are also designed and used for high end cabinetry, where the walls of the cabinet are much thicker than common kitchen and bathroom cabinetry, and where the dimensional tolerances in designing and manufacturing the cabinetry are more precise.

In common kitchens and bathrooms, where the tolerances of the cabinetry are not as precise, and where there are often misshapen, slightly warped, and/or different sized cabinets, it would be advantageous to have drawer glides that utilize the more smooth, linear operation of a ball bearing guide, yet are still light-weight, low cost, and can function within a cabinet that does not have the thick paneling and precise tolerances found in the cabinetry described above. Thus, it would be advantageous to have drawer glides that have tight capture, as described above, such that the elongate guides 14, 18 do not fall of or slip away from one another as occurs with epoxy glides, and also advantageous to have drawer glides that can be installed in cabinets with relatively low dimensional tolerances and thin paneling.

The drawer glide mechanism 10 described above can accomplish these goals by utilizing, for example, an inexpensive, single plastic socket piece, such as v-notch socket 12, with relatively thin metal guide members 14, 18, and a metal ball bearing component 16. The drawer glide mechanism 10 described above is both light-weight and low cost, can be used interchangeably with common v-notch sockets typically used in kitchen bathrooms and cabinets, and affords the consistently smooth and well-structured movement that is desired.

Additionally, while the drawer glide mechanism 10 can be made to have a smooth operation and have tight tolerances, the drawer glide 10 can also advantageously include one or more components to facilitate adjustment of the guide members 14, 18 and/or of an attached drawer. For example, and as described above, the drawer glide mechanism 10 can include one or more floating and fixed members, slots, and/or embossing. These components can aid in the installation and proper adjustment of a drawer within a kitchen or bathroom cabinet. Additionally, or alternatively, the drawer glide mechanism 10 can include a v-notch socket 12 that has opening(s) such as a first opening and second opening 22, 24 that facilitate relative movement of the first elongate guide member 12 with the drawer cabinet itself (e.g. to the back wall panel 82 of the drawer cabinet 78). Advantageously, these adjustments can be self-adjusting. Thus, no additional equipment, fasteners, and/or any type of further mechanical adjustment is required by an operator once the drawer has initially been installed.

While the above embodiments are described in the context of a kitchen or bathroom cabinet, the embodiments described above can be used in other environments as well, including but not limited to other areas of a home, in commercial settings such as offices, warehouses, etc. Additionally, while the embodiment of the drawer glide mechanism 10 described above and illustrated in FIGS. 1-18 includes a v-notch socket 12, a first elongate guide member 14, a ball bearing component 16, a second elongate guide member 18, two floating members 54, two fixed members 56, a slot 52, and an embossed portion 74, other combinations and numbers of components can also be used. For example, in some embodiments a drawer glide mechanism can include a v-notch socket 12, a first elongate guide member 14, a ball bearing component 16, a second elongate guide member 18, three floating members 54, three fixed members 56, and an embossed portion 74. In some embodiments a drawer glide mechanism can include a v-notch socket 12, a first elongate guide member 14, a ball bearing component 16, a second elongate guide member 18, two floating members 54, and two fixed members 56. In some embodiments a drawer glide mechanism can include a v-notch socket 12, a first elongate guide member 14, a ball bearing component 16, and a second elongate guide member 18. In some embodiments a drawer glide mechanism can include a v-notch socket 12, a first elongate guide member 14, a ball bearing component 16, a second elongate guide member 18, two floating members 54, two fixed members 56, and a slot 52. Various other combinations are also possible.

Furthermore, in some embodiments the drawer glide mechanism can comprise for example a common epoxy glide, without a ball bearing component, but can include one or more floating members 54, fixed members 56, slots 52, and/or embossed portions 74. Thus, the floating and fixed members 54, 56, as well as other features described above including but not limited to the slot 52 and embossed portion 74, can be used not only on a ball bearing glide like drawer glide mechanism 10 described above, but on any type of glide mechanism.

With reference to FIGS. 21 and 22, another embodiment of a drawer glide mechanism 210 is illustrated. The drawer glide mechanism 210 can be similar to, and/or have similar or identical components as that of drawer glide mechanisms 10 described above. For example, the drawer glide mechanism 210 can comprise a first elongate guide member 212 and a second elongate guide member 214. The first elongate guide member 212 and second elongate member 214 can comprise elongate pieces of metal, plastic, or other suitable material. The first elongate guide member 212 can be coupled to the second elongate guide member 214. For example, the second elongate guide member 214 can be nested and captured within a ball bearing component 216 having a plurality of ball bearings, and the ball bearing component 216 can be nested and captured within first elongate guide member 212, such that the drawer glide mechanism maintains tight tolerances and a smooth, relative movement between the first and second guide members 212, 214. The second elongate guide member 214 can be free to move (e.g. glide) relative to the first elongate guide member 212 in at least one direction via the ball bearing component 216. For example, the second elongate guide member 214 can glide alongside a length the first elongate guide member 212, generally parallel to the first elongate guide member 212.

With continued reference to FIGS. 21 and 22, the drawer glide mechanism 210 can comprise an attachment structure 218. The attachment structure 218 can be used to attach the drawer glide mechanism 210, and specifically the first elongate guide member 212, directly to the inside back paneling of a drawer cabinet. The attachment structure 218 can be used to attach the drawer glide mechanism 210 to the inside back paneling of a drawer cabinet without the use of a separate socket piece. For example, the attachment structure 218 can advantageously be used to attach a metal ball bearing drawer glide mechanism, such as mechanism 210, directly to the inside back paneling of a drawer cabinet (e.g. drawer cabinet 78), without the use of a plastic v-notch socket like that illustrated in FIGS. 5-9.

As described above, a v-notch socket is commonly used to attach an epoxy glide to the inside back portion of a storage structure. In ball bearing glide mechanisms used in industrial settings, large two-piece sockets are used. Thus, drawer glide mechanisms currently employ the use of a separate piece designed specifically to couple the guide members to the inside back portion of a storage device. At least in some embodiments, it would be more efficient and advantageous (e.g. from a cost and manufacturing standpoint) to have a drawer glide mechanism that avoids entirely the use of a separate piece for attachment. Thus, it would be advantageous if one or more of the drawer guide members in a drawer glide mechanism could be attached directly to the inside back portion of a storage device.

It would also be advantageous for a drawer glide mechanism to not only attach directly to the inside back portion of a storage device, but also to permit at least some relative movement of the drawer glide mechanism relative to the storage device. For example, with a v-notch socket like that described above, the distal end of a guide member is generally able to slide laterally back and forth within an opening in the v-notch socket. With a two-piece socket, one of the pieces is permitted to slide laterally with respect to the other piece. Thus, with these types of separate socket pieces, there is permitted at least some limited relative movement, such that the drawer glide can be adjusted as desired (e.g. to better fit, slide, etc. within the cabinet).

With reference to FIGS. 21 and 22, the attachment structure 218 can be configured to not only attach directly to the inside back paneling of a drawer cabinet, but also permit at least some relative (e.g. lateral and/or vertical) movement of the drawer glide mechanism 210 relative to the drawer cabinet. For example, the attachment structure 218 can comprise a bent distal end 220 of the first elongate guide member 212. The bent distal end 220 can be integrally formed with and part of the first elongate guide member 212. The bent distal end 220 can include at least one slot 222. The slots 222 can be oriented horizontally, as illustrated in FIG. 21, though other orientations are also possible (e.g. vertical, angled).

The attachment structure 218 can also comprise at a first dowel portion 224. The first dowel portion 224 can comprise, for example, a fastener such as a common screw.

The attachment structure 218 can also comprise at least a second dowel portion 226. The second dowel portion 226 can comprise, for example, a plastic dowel piece configured to be inserted into the back side paneling 221 of a drawer cabinet, and to expand and anchor itself once inserted through the back side paneling 221 (see FIG. 22). Specifically, the second dowel portions 226 can be configured to be inserted into a relatively thin back side drawer cabinet panel. For example, in some embodiments, the second dowel portions 226 can be configured to be inserted into a thin back side drawer cabinet panel that is no greater than 5 mm in thickness. In some embodiments the second dowel portions 226 can be configured to be inserted into a back side drawer cabinet panel that is no greater than 4 mm in thickness. In some embodiments the attachment second dowel portions 226 can be configured to be inserted into a back side drawer cabinet panel that is no greater than 3 mm in thickness. In some embodiments the second dowel portions 226 can be configured to be inserted into a back side drawer cabinet panel that is no greater than 2 mm in thickness. In some embodiments, the first and second dowel portions 224, 226 can be integrally formed.

In some embodiments, the first dowel portions 224 can comprise metal screws, and can be inserted through the slots 222, as shown in Detail A of FIG. 21, and into plastic second dowel portions 226. In some embodiments, prior to the first dowel portions 224 being attached to the second dowel portions 226, the second dowel portions 226 can first be inserted into the back side paneling of a drawer cabinet, such that the second dowel portions 226 are anchored in place. The bent distal end 220 can then be moved into position such that the slots 222 are adjacent the second dowel portions 226. The first dowel portions 224 can then be inserted through the slots 222 and into the second dowel portions 226. In at least some embodiments, a set of plastic second dowel portions 226, in combination with metal or plastic first dowel portions 224, and bent distal end 220, can alone facilitate holding an attached metal first elongate guide member 212, metal ball bearing component 216, and metal second elongate guide member 214 in place within a drawer cabinet, even if the drawer cabinet has relatively thin paneling. Thus, no additional, separate socket piece is required.

Additionally, because of the slots 222, the attachment structure 218 can facilitate a floating arrangement. For example, the second dowel portions 226 can float within the slots 222 (e.g. at least in a lateral direction) relative to the first elongate guide member 212, prior to installation. Once the drawer glide mechanism 210 has been installed inside a drawer cabinet, the first elongate guide member 212 can likewise float and move laterally along the first dowel portions 224. This advantageously permits adjustability of the drawer glide mechanism 210, at least in a lateral direction, similar to how the v-notch socket 12 described above also permits adjustability of the drawer glide mechanism 10. Additionally, in this arrangement the attachment structure 218 can permit self-adjustment of the drawer glide mechanism 210 within the drawer cabinet, since no additional mechanical adjustment is required once the drawer glide mechanism 210 has been installed. Rather, the drawer glide mechanism 210 can simply self-adjust by sliding along the first dowel portions 224 until a desired position of the drawer glide mechanism 210 is achieved.

Furthermore, while the attachment structure 218 is described above in the context of including the bent distal end 220 of the first elongate guide member 212 as part of the attachment structure 218, in some embodiments it is alternatively possible for the attachment structure 218 to be a separate piece that is attached (e.g. releasably attached) to the first elongate guide member 212. For example, in some embodiments the distal end 220 illustrated in FIGS. 21 and 22 could comprise part of an overall separate attachment structure 218 that slides over, or otherwise releasably connects to, the first elongate guide member 212. In such an embodiment, the entire attachment structure 218 could easily be removed from the first elongate guide member 212 and replaced if necessary, or used for example on another drawer glide mechanism. This would permit interchangeable parts that could be reused and designed for various sizes of kitchen and bathroom cabinets. Desirably, a separate piece attachment structure 218 could be less expensive and easier to manufacture than the single socket v-notch piece 12 described above.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A drawer system comprising:
    a drawer cabinet comprising a back side panel, two sidewall panels, and a plurality of face frame components;
    a drawer glide mechanism comprising:
        a first elongate guide member having a longitudinally extending body;
        a second elongate guide member nested at least partially within the first elongate guide member, the second elongate guide member having a longitudinally extending body;
        a ball bearing component comprising a plurality of ball bearings positioned between at least a portion of the first elongate guide member and at least a portion of the second elongate guide member, the ball bearing component configured to permit longitudinal movement of the second elongate guide member relative to the first elongate guide member;
        an attachment structure configured to secure the first elongate guide member to the back side panel of the drawer cabinet, the attachment structure comprising an abutment surface extending at a substantially right angle with respect to a length of the first elongate guide member, the abutment surface comprising a first slot and a second slot;
        a first dowel portion configured to extend into at least a portion of the back side panel of the drawer cabinet, the first dowel portion extending through the first slot of the abutment surface;
        a second dowel portion connected to the first dowel portion, said second dowel portion configured to extend into at least a portion of the back side panel and anchor itself to the back side panel, the first and second dowel portions configured to slide in at least one direction with respect to the first slot of the abutment surface;
        a third dowel portion configured to extend into at least a portion of the back side panel of the drawer cabinet, the third dowel portion extending through the second slot of the abutment surface; and
        a fourth dowel portion connected to the third dowel portion, said fourth dowel portion configured to extend into at least a portion of the back side panel and anchor itself to the back side panel, the third and fourth dowel portions configured to slide in at least one direction with respect to the second slot; and
    a drawer comprising a back drawer panel, two side drawer panels, and a front drawer panel, the drawer configured to attach to the second elongate guide member;
    wherein, when the drawer glide mechanism is in an installed position, the first elongate guide member and the abutment surface are configured to slide along the first and third dowel portions in a floating arrangement to permit self-adjustment of the drawer glide mechanism within the drawer cabinet.

2. The drawer system of claim 1, wherein the first slot and the second slot are parallel with one another.

3. The drawer system of claim 1, wherein each of the first and third dowel portions is a screw.

4. The drawer system of claim 1, wherein each of the second and fourth dowel portions comprises plastic.

5. The drawer system of claim 1, wherein the first elongate guide member further comprises a sidewall attachment mechanism, and wherein the first elongate guide member is attached to one of the plurality of face frame components with the sidewall attachment mechanism.

6. The drawer system of claim 5, wherein the sidewall attachment mechanism is rigidly affixed to a side of the first elongate guide member.

7. The drawer system of claim 1, wherein the first and second dowel portions are integral.

8. The drawer system of claim 7, wherein the third and fourth dowel portions are integral.

9. A drawer glide mechanism configured for use with a drawer cabinet, the drawer glide mechanism comprising:
    a first elongate guide member having a longitudinally extending body;
    a second elongate guide member nested at least partially within the first elongate guide member, the second elongate guide member having a longitudinally extending body and configured to be secured to a drawer;
    a ball bearing component comprising a plurality of ball bearings positioned between at least a portion of the first elongate guide member and at least a portion of the second elongate guide member, the ball bearing component configured to permit movement of the second elongate guide member relative to the first elongate guide member;
    an attachment structure configured to secure the first elongate guide member to a back side panel of the drawer cabinet, the attachment structure comprising an abutment surface extending at a substantially right angle with respect to a length of the first elongate guide member, the abutment surface comprising a first slot and a second slot;
    a first dowel portion configured to extend into at least a portion of the back side panel of the drawer cabinet when the drawer glide mechanism is in an installed position, the first dowel portion extending through the first slot of the abutment surface;
    a second dowel portion connected to the first dowel portion, said second dowel portion configured to extend into at least a portion of the back side panel and anchor itself to the back side panel when the drawer glide mechanism is in the installed position, the first and second dowel portions configured to slide in at least one direction with respect to the first slot of the abutment surface;
    a third dowel portion configured to extend into at least a portion of the back side panel of the drawer cabinet when the drawer glide mechanism is in the installed position, the third dowel portion extending through the second slot of the abutment surface; and
    a fourth dowel portion connected to the third dowel portion, said fourth dowel portion configured to extend into at least a portion of the back side panel and anchor itself to the back side panel when the drawer glide mechanism is in the installed position, the third and fourth dowel portions configured to slide in at least one direction with respect to the second slot;
    wherein, when the drawer glide mechanism is in the installed position, the first elongate guide member and the abutment surface are configured to slide along the first and third dowel portions in a floating arrangement to permit self-adjustment of the drawer glide mechanism within the drawer cabinet.

10. The drawer glide mechanism of claim 9, wherein the first slot and the second slot are parallel with one another.

11. The drawer glide mechanism of claim 9, wherein each of the first and third dowel portions is a screw.

12. The drawer glide mechanism of claim 9, wherein each of the second and fourth dowel portions comprises plastic.

13. The drawer glide mechanism of claim 9, wherein the first elongate guide member further comprises a sidewall attachment mechanism configured to secure the first elongate guide member to a portion of the drawer cabinet.

14. The drawer glide mechanism of claim 13, wherein the sidewall attachment mechanism is rigidly affixed to a side of the first elongate guide member.

15. A drawer glide mechanism configured for use with a drawer cabinet, the drawer glide mechanism comprising:
- a first elongate guide member having a longitudinally extending body;
- a second elongate guide member nested at least partially within the first elongate guide member, the second elongate guide member having a longitudinally extending body and configured to be secured to a drawer;
- a ball bearing component configured to permit movement of the second elongate guide member relative to the first elongate guide member;
- an attachment structure configured to secure the first elongate guide member to a back side panel of the drawer cabinet, the attachment structure comprising an abutment surface, the abutment surface comprising a first slot and a second slot;
- a first dowel portion extending through the first slot of the abutment surface;
- a second dowel portion connected to the first dowel portion, said second dowel portion configured to extend into at least a portion of the back side panel and anchor itself to the back side panel when the drawer glide mechanism is in an installed position, the first and second dowel portions configured to slide in at least one direction with respect to the first slot of the abutment surface;
- a third dowel portion extending through the second slot of the abutment surface; and
- a fourth dowel portion connected to the third dowel portion, said fourth dowel portion configured to extend into at least a portion of the back side panel and anchor itself to the back side panel when the drawer glide mechanism is in the installed position, the third and fourth dowel portions configured to slide in at least one direction with respect to the second slot;
- wherein, when the drawer glide mechanism is in the installed position, the first elongate guide member and the abutment surface are configured to slide along the first and third dowel portions in a floating arrangement to permit self-adjustment of the drawer glide mechanism within the drawer cabinet.

16. The drawer glide mechanism of claim 15, wherein the first slot and the second slot are parallel with one another.

17. The drawer glide mechanism of claim 15, wherein the first elongate guide member further comprises a sidewall attachment mechanism configured to secure the first elongate guide member to a portion of the drawer cabinet.

18. The drawer glide mechanism of claim 17, wherein the sidewall attachment mechanism is rigidly affixed to a side of the first elongate guide member.

* * * * *